(12) United States Patent
Jia et al.

(10) Patent No.: US 10,705,322 B2
(45) Date of Patent: Jul. 7, 2020

(54) WIDE-ANGLE CAMERA LENS

(71) Applicant: Zhejiang Sunny Optics Co., Ltd., Ningbo (CN)

(72) Inventors: Yuanlin Jia, Ningbo (CN); Fujian Dai, Ningbo (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 295 days.

(21) Appl. No.: 15/578,707

(22) PCT Filed: Jan. 25, 2017

(86) PCT No.: PCT/CN2017/072534
§ 371 (c)(1),
(2) Date: Nov. 30, 2017

(87) PCT Pub. No.: WO2018/006592
PCT Pub. Date: Jan. 11, 2018

(65) Prior Publication Data
US 2019/0187443 A1    Jun. 20, 2019

(30) Foreign Application Priority Data
Jul. 8, 2016    (CN) .......................... 2016 1 0543395

(51) Int. Cl.
*G02B 13/06*         (2006.01)
*G02B 13/04*         (2006.01)
(Continued)

(52) U.S. Cl.
CPC ............... *G02B 13/06* (2013.01); *G02B 9/64* (2013.01); *G02B 13/04* (2013.01); *G02B 13/18* (2013.01)

(58) Field of Classification Search
CPC ...... G02B 13/0045; G02B 9/64; G02B 13/18; G02B 27/0025; G02B 13/04
(Continued)

(56) References Cited

U.S. PATENT DOCUMENTS

2012/0147485 A1* 6/2012 Kubota ..................... G02B 9/62
                                                              359/794
2014/0340769 A1* 11/2014 Shimada ................. G02B 13/06
                                                              359/754
(Continued)

FOREIGN PATENT DOCUMENTS

CN          202886713 U       4/2013
CN          103901583 A       7/2014
(Continued)

*Primary Examiner* — Mohammed A Hasan
(74) *Attorney, Agent, or Firm* — Sughrue Mion, PLLC

(57) ABSTRACT

The present invention provides a wide-angle camera lens consisting of seven lens elements. The wide-angle camera lens successively includes: a first optical lens with negative refractive power; a second optical lens with negative refractive power; a third optical lens with negative refractive power, an image side surface of the third optical lens being a convex surface; a fourth optical lens with refractive power; a fifth optical lens with refractive power; a sixth optical lens with refractive power; and a seventh optical lens with refractive power from an object side to an image side, wherein −5.5<f1/f<−2; −2.5<f5/f6<−0.5; f1 is an effective focal length of the first optical lens, f is an effective focal length of the wide-angle camera lens, f5 is an effective focal length of the fifth optical lens, and f6 is an effective focal length of the sixth optical lens.

13 Claims, 23 Drawing Sheets

(51) Int. Cl.
*G02B 9/64* (2006.01)
*G02B 13/18* (2006.01)

(58) Field of Classification Search
USPC .......................................................... 359/708
See application file for complete search history.

(56) References Cited

U.S. PATENT DOCUMENTS

2016/0139372 A1   5/2016   Tanaka
2018/0307011 A1*  10/2018  Uehara ................ G02B 15/177
2019/0072838 A1*  3/2019   Toyoda ................ G03B 21/142

FOREIGN PATENT DOCUMENTS

| CN | 104101985 A | 10/2014 |
|----|-------------|---------|
| CN | 105372789 A | 3/2016 |
| CN | 105974561 A | 9/2016 |
| JP | 2011-075915 A | 4/2011 |
| JP | 2014232185 A | 12/2014 |
| JP | 2016-038548 A | 3/2016 |
| WO | 201603732 A1 | 1/2016 |

\* cited by examiner

WIDE-ANGLE CAMERA LENS

CROSS REFERENCE TO RELATED APPLICATIONS

This application is the national phase entry of International Application PCT/CN2017/072534, filed on Jan. 25, 2017, which is based upon and claims priority to Chinese Patent Application No. 201610543395.9, filed on Jul. 8, 2016, the entire contents of which are incorporated herein by reference.

TECHNICAL FIELD

The present invention relates to a camera lens, and in particular relates to a wide-angle camera lens consisting of seven optical lenses.

BACKGROUND ART

With the development of science and technology, wide-angle camera lenses include various camera lenses with visual angles greater than standard lenses, such as ultra-wide-angle lenses, fish-eye lenses and the like, and can play an important role in more and more fields such as photography, security protection, measurement, projection, entertainment, on-vehicle mounting and the like. In the aspect of the photography, because of the short-focus and large-field-of-view characteristics of the ultra-wide-angle lens, formed unique barrel distortion may bring about strong visual shock to an observer; in the aspect of the measurement, because of the large-field-of-view characteristic of the ultra-wide-angle lens, more information can be obtained by virtue of one-time imaging, so that more data can be measured; in the aspect of the projection, a conventional projection lens forms an image on a face, while a large-field-of-view fish-eye lens can form an image on an annular sky curtain, so that an immersive film watching feeling of watching the starry sky in summer can be obtained; and in the aspect of the on-board application, with the ultra-wide field angle, a wider side area can be observed, and the looking-around application in a driving process is facilitated. A photosensitive element of an ordinary optical system is generally a Charge Coupled Device (CCD) or a Complementary Metal-Oxide-Semiconductor Transistors (CMOS). With the improvement of a semiconductor process technology, the pixel size of the photosensitive element is reduced, and the optical system tends to be higher in resolution and higher in imaging quality; and meanwhile, in viewing of the popularization of products, the size of the lens is required to be smaller and smaller, and lower cost is required.

At present, an ordinary ultra-wide-angle lens generally adopts an all-glass structure. For example, as shown in a patent with the patent number of "WO201603732A1", a lens consists of seven glass optical lenses, to provide a photographic object lens with a large relative aperture and a small volume. However, due to the increasing development of portable electronic products, and particularly the increasing demand on the 360-degree look-around application in the market at present, the requirement on the performance of the camera lens such as miniaturization, light weight, ultra-wide angle, imaging quality and the like is further higher. In order to meet the miniaturization and light weight requirement, an overall length of the lens needs to be further reduced, and a plastic optical lens is also needed. The known all-glass structure cannot further reduce the overall length of the system and enlarge the field angle on the premise of ensuring the imaging quality. Generally speaking, the employing of aspheric surfaces cannot only remarkably improve the image quality and decrease the aberration, but also reduce the number of the optical lenses of the camera lenses and reduce the volumes. The aspheric optical lenses can be made of glass and plastics, and the combination of the glass and plastics can greatly improve the performance of the ultra-wide-angle lens.

SUMMARY OF THE INVENTION

The present invention aims at providing a wide-angle camera lens that is miniaturized, has high imaging quality and adopts an aspheric surface.

For this purpose, the present invention provides a wide-angle camera lens. From an object side to an image side, the camera lens successively includes: a first optical lens with negative refractive power; a second lens with refractive power; a third lens with negative refractive power, an image side surface of the third lens being a convex surface; a fourth lens with refractive power; a fifth lens with refractive power; a sixth lens with refractive power; and a seventh lens with refractive power; and the camera lens satisfies the following relational expression: $-5.5 < f1/f < -2$; $-2.5 < f5/f6 < -0.5$, wherein f1 is an effective focal length of the first optical lens, f is an effective focal length of the wide-angle camera lens, f5 is an effective focal length of the fifth optical lens, and f6 is an effective focal length of the sixth optical lens. The technical solution can realize the wide angle or ultra-wide angle, miniaturization, high definition and high relative illumination of the camera lens.

Further, an object side surface of the first optical lens of the wide-angle camera lens of the present invention is a convex surface, and its image side surface is a concave surface.

Further, the second optical lens of the wide-angle camera lens of the present invention has a refractive power, and its image side surface is a concave surface.

Further, an object side surface of the third optical lens of the wide-angle camera lens of the present invention is a concave surface.

Further, the wide-angle camera lens of the present invention satisfies the following relational expression: $0.5 < R5/R6 < 1$, wherein R5 is a curvature radius of the object side surface of the third optical lens; and R6 i a curvature radius of the image side surface of the third optical lens. By adjusting the curvature radius of the two surfaces, the angle of incidence light can be reduced, and the relative illumination of the edge is ensured while the high-order aberration is reduced.

Further, the fourth optical lens of the wide-angle camera lens of the present invention has a positive refractive power, and the object side surface of the fourth optical lens is a convex surface.

Further, an object side surface of the fifth optical lens of the wide-angle camera lens of the present invention is a convex surface.

Further, an object side surface of the seventh optical lens of the wide-angle camera lens of the present invention is a convex surface.

The above design can effectively relieve chromatic aberration of the camera lens and increase the definition of a picture.

Further, the wide-angle camera lens of the present invention satisfies the following relational expression: $2.5 < DT11/DT72 < 3.7$, wherein DT11 is an effective radius of the object side surface of the first optical lens, and DT72 is an effective radius of the image side surface of the seventh optical lens. A too large ratio is adverse to the assembling, and a too small ratio is adverse to rectifying the off axis aberration. When the ratio range is satisfied, an assembly process can be favorably simplified on the basis of ensuring the image quality.

Further, the wide-angle camera lens of the present invention satisfies the following relational expression: $0.8<DT31/DT72<1.2$, wherein DT31 is an effective radius of the object side surface of the third optical lens; and DT72 is an effective radius of the image side surface of the seventh optical lens. A too small ratio is adverse to the assembling, and a too big, ratio is adverse to eliminating the off axis aberration. When the ratio range is satisfied, a comprehensive effect for giving consideration to both the assembly process and the picture definition is achieved.

Further, the wide-angle camera lens of the present invention satisfies the following relational expression: $0.45<ImgH\times tan(FOV/3)/TTL<0.8$, wherein ImgH is half of a diagonal line length of an effective pixel area of an electronic photosensitive element, FOV is a maximum field angle of the ultra-wide-angle lens, and TTL is an axial distance from the object side surface of the first optical lens to an image side surface of the wide-angle lens. By adopting the above design, the ultra-wide angle, miniaturization and high definition of the camera lens can be facilitated.

Further, the wide-angle camera lens of the present invention satisfies the following relational expression: $0.4<CT2/CT3<1$, wherein CT2 is a center thickness of the second optical lens on an optical axis, and CT3 is a center thickness of the third optical lens on the optical axis. If the ratio is too small, it is unfavorable for the molding and assembly, and if the ratio is too big, it is unfavorable for eliminating the chromatic aberration.

Further, the wide-angle camera lens of the present invention satisfies the following relational expression: $0.3<\Sigma CT/TTL<0.5$, wherein $\Sigma CT$ is a sum of the center thicknesses of the first optical lens to the seventh optical lens on the optical axis, and TTL is an axial distance from the object side surface of the first optical lens to an image side surface of the wide-angle lens. By adopting the design, on the premise of ensuring the imaging quality and facilitating the assembly, an overall length of the system is effectively reduced, and the miniaturization requirement can be satisfied.

Further, the wide-angle camera lens of the present invention satisfies the following relational expression: $0.5<T34\times 10/T23<1.2$, wherein T34 is an axial spacing distance of the third optical lens and the fourth optical lens, and T23 is an axial spacing distance of the second optical lens and the third optical lens. If the ratio is too big, it is unfavorable for eliminating the chromatic aberration, and if the ratio is too small, it is unfavorable for eliminating off axis monochromatic aberration. The design facilitates the balancing of various aberrations, thereby realizing the high definition.

Beneficial Effects

The present invention has the beneficial effects that the first optical lens has negative refractive power, so that the field angle of the system can be effectively increased. By utilizing multiple aspheric surfaces and allocating the positive and negative refractive power, the high definition and high illumination can be realized in the large visual angle, and the relative brightness is ensured. By mixing and matching glass and plastics, the cost can be decreased on the premise of maintaining environmental reliability, and the miniaturization can be realized.

DETAILED DESCRIPTION OF THE INVENTION

The present invention is further described below in combination with drawings and embodiments.

Embodiment I

Figure 1:
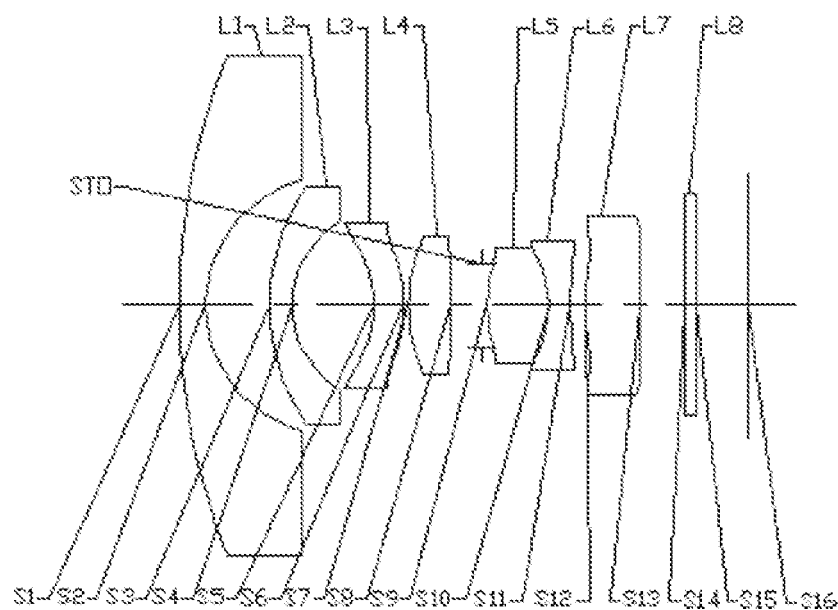
FIG. 1 is a structural schematic diagram of a wide-angle camera lens according to embodiment I.
Figure 2:
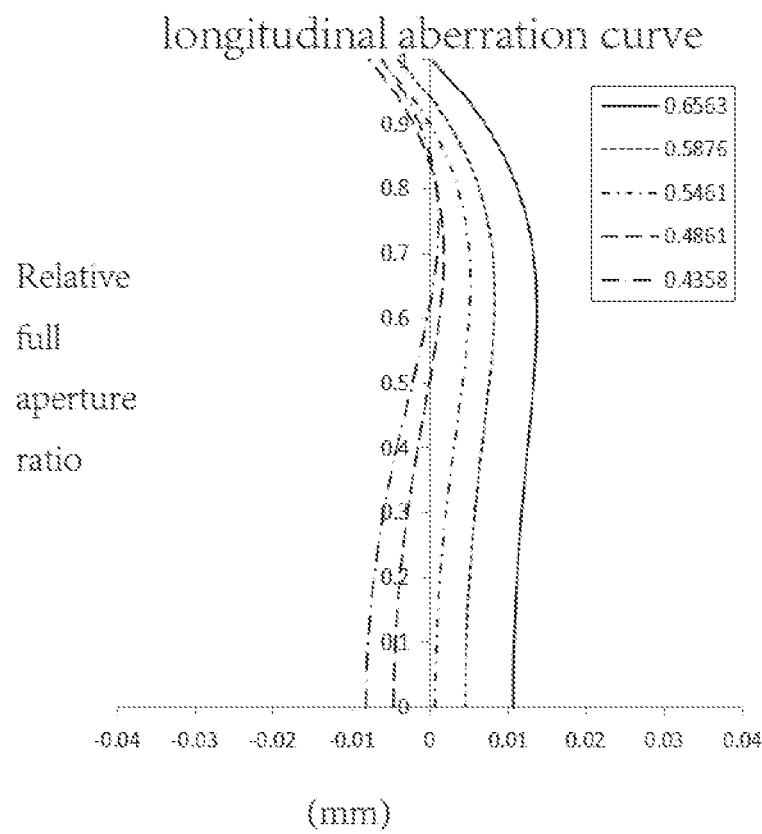
FIG. 2 is a longitudinal aberration diagram of the wide-angle camera lens according to embodiment I.
Figure 3:
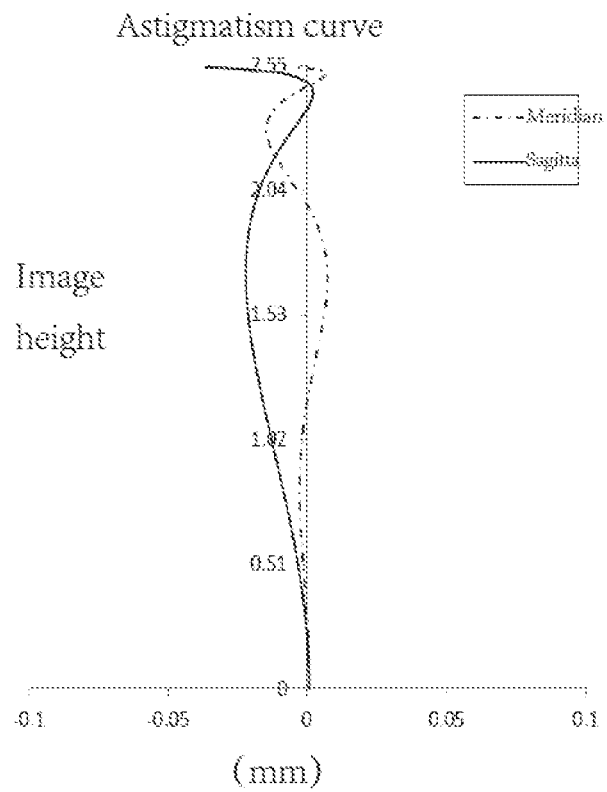
FIG. 3 is an astigmatism diagram of the wide-angle camera lens according to embodiment I.
Figure 4:
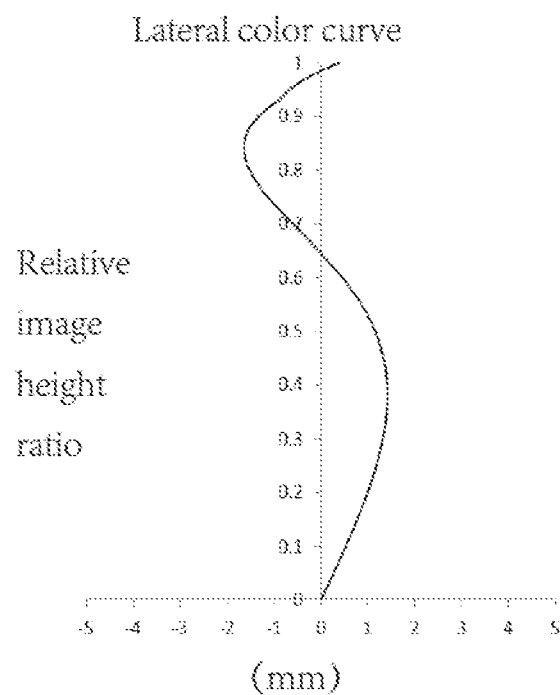
FIG. 4 is a lateral color diagram of the wide-angle camera lens according to embodiment I.
Figure 5:
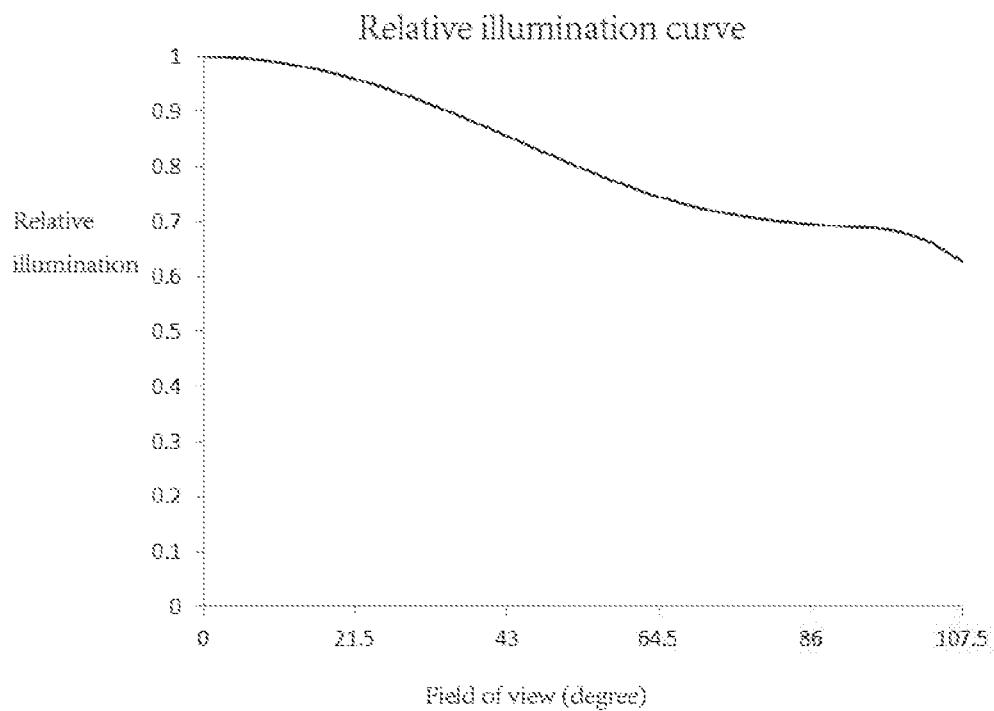
FIG. 5 is a relative illumination curve diagram of the wide-angle camera lens according to embodiment I.

Referring to FIG. 1, a wide-angle camera lens according to the present embodiment is successively provided with: a first optical lens L1 with negative refractive power, a second optical lens L2 with negative refractive power, a third optical lens L3 with negative refractive power, a fourth optical lens L4 with positive refractive power, a fifth optical lens L5 with positive refractive power, a sixth optical lens L6 with negative refractive power, a seventh optical lens L7 with positive refractive power and a light filter L8 along an optical axis from an object side to an image side. The first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S10 and an image side surface S11, the seventh optical lens L7 has an object side surface S12 and an image side surface S13, and the light filter L8 has an object side surface S14 and an image side surface S15. An image side surface S16 of the wide-angle camera lens according to the present embodiment is disposed at an image side of the light filter L8, and can be used for mounting a photosensitive element.

Main design parameters of the wide-angle camera lens according to the present embodiment are shown in the following table:

| Name | Numerical value |
|---|---|
| Effective focal length of the first optical lens: f1(mm) | −5.06 |
| Effective focal length of the second optical lens: f2(mm) | −6.97 |
| Effective focal length of the third optical lens: f3(mm) | −22.63 |
| Effective focal length of the fourth optical lens: f4(mm) | 5.16 |
| Effective focal length of the fifth optical lens: f5(mm) | 4.47 |
| Effective focal length of the sixth optical lens: f6(mm) | −8.27 |
| Effective focal length of the seventh optical lens: f7(mm) | 7.43 |
| Effective focal length of the wide-angle camera lens: f(mm) | 1.68 |
| Axial distance from the object side surface of the first lens to an image side surface of the wide-angle lens: TTL (mm) | 11 |
| f1/f | −3.00 |
| f5/f6 | −0.54 |
| R5/R6 | 0.76 |
| DT11/DT72 | 2.80 |
| DT31/DT72 | 0.91 |
| ImgH × tan(FOV/3)/TTL | 0.70 |
| CT2/CT3 | 0.79 |
| ΣCT/TTL | 0.45 |
| T34 × 10/T23 | 0.64 | wherein R5 is a curvature radius of the object side surface of the third optical lens; R6 is a curvature radius of the image side surface of the third optical lens; DT11 is an effective radius of the object side surface of the first optical lens; DT72 is an effective radius of the image side surface of the seventh optical lens; DT31 is an effective radius of the object side surface of the third optical lens; ImgH is half of a diagonal line length of an effective pixel area of an electronic photosensitive element; FOV is a maximum field angle of an ultra-wide-angle optical lens; TTL is an axial distance from the object side surface of the first optical lens to an image side surface of the wide-angle lens; CT2 is a center thickness of the second optical lens on the optical axis; CT3 is a center thickness of the third optical lens on the optical axis; ΣCT is a sum of the center thicknesses of the first optical lens to the seventh optical lens on the optical axis; T34 is an axial spacing distance of the third optical lens and the fourth optical lens; and T23 is an axial spacing distance of the second optical lens and the third optical lens.

In order to realize the above design parameters, the specific design adopted by the wide-angle camera lens according to the present embodiment is shown in the following table:

| Surface number | Surface type | Curvature radius | Thickness | Material | Conic Coefficient |
|---|---|---|---|---|---|
| OBJ | Spherical surface | Infinity | Infinity | | |
| S1 | Spherical surface | 13.1247 | 0.5015 | 1.62/60.3 | |
| S2 | Spherical surface | 2.5034 | 1.2400 | | |
| S3 | Spherical surface | 4.1890 | 0.4400 | 1.54/55.8 | |

-continued

| Surface number | Surface type | Curvature radius | Thickness | Material | Conic Coefficient |
|---|---|---|---|---|---|
| S4 | Spherical surface | 1.9049 | 1.5920 | | |
| S5 | Aspheric surface | −2.0259 | 0.5598 | 1.54/55.8 | 0.0000 |
| S6 | Aspheric surface | −2.6657 | 0.1021 | | 0.0000 |
| S7 | Aspheric surface | 3.0174 | 0.8205 | 1.58/30.2 | 0.0000 |
| S8 | Aspheric surface | 698.2327 | 0.6005 | | 0.0000 |
| STO | Spherical surface | Infinity | 0.1000 | | |
| S9 | Spherical surface | 2.8802 | 1.1969 | 1.76/52.3 | |
| S10 | Spherical surface | −2.0000 | 0.4200 | 1.85/23.8 | |
| S11 | Spherical surface | 11.9125 | 0.2780 | | |
| S12 | Aspheric surface | 3.2604 | 1.0509 | 1.54/55.8 | 2.6000 |
| S13 | Aspheric surface | 15.7589 | 0.8879 | | 0.0000 |
| S14 | Spherical surface | Infinity | 0.2100 | 1.52/64.2 | |
| S15 | Spherical surface | Infinity | 1.0000 | | |
| S16 | Spherical surface | Infinity | | | |

High-order term coefficients (A4, A6, A8, A10, A12 and A14) of the aspheric surfaces of aspheric lenses in the wide-angle camera lens according to the present embodiment are shown in the following table:

| Surface number | A4 | A6 | A8 | A10 | A12 | A14 |
|---|---|---|---|---|---|---|
| S5 | 6.7905E−03 | 2.6800E−03 | 4.6311E−03 | −7.8678E−04 | −2.2169E−07 | 0.0000E+00 |
| S6 | −3.1846E−03 | 1.3417E−02 | −1.4530E−03 | 9.5912E−04 | −8.8651E−07 | 0.0000E+00 |
| S7 | −1.4041E−02 | 2.6535E−03 | 1.6869E−04 | 2.6716E−04 | −1.9773E−17 | 0.0000E+00 |
| S8 | −1.1948E−02 | −9.4735E−03 | 4.6268E−03 | −4.4484E−04 | −1.9773E−17 | −2.6598E−19 |
| S12 | −5.1018E−02 | −1.1943E−02 | 2.9467E−03 | −3.4944E−03 | −9.2206E−05 | 0.0000E+00 |
| S13 | 5.4081E−03 | −8.1670E−03 | −7.3284E−04 | 2.1246E−04 | −6.9990E−06 | 0.0000E+00 |

The wide-angle camera lens according to the present embodiment well corrects off axis aberration, the brightness of an edge image surface, distortion and the like on the basis of realizing an ultra-wide angle; and referring to FIGS. 2, 3, 4 and 5, good usability and high relative illumination are maintained while the miniaturization is realized.

Embodiment II

Figure 6:
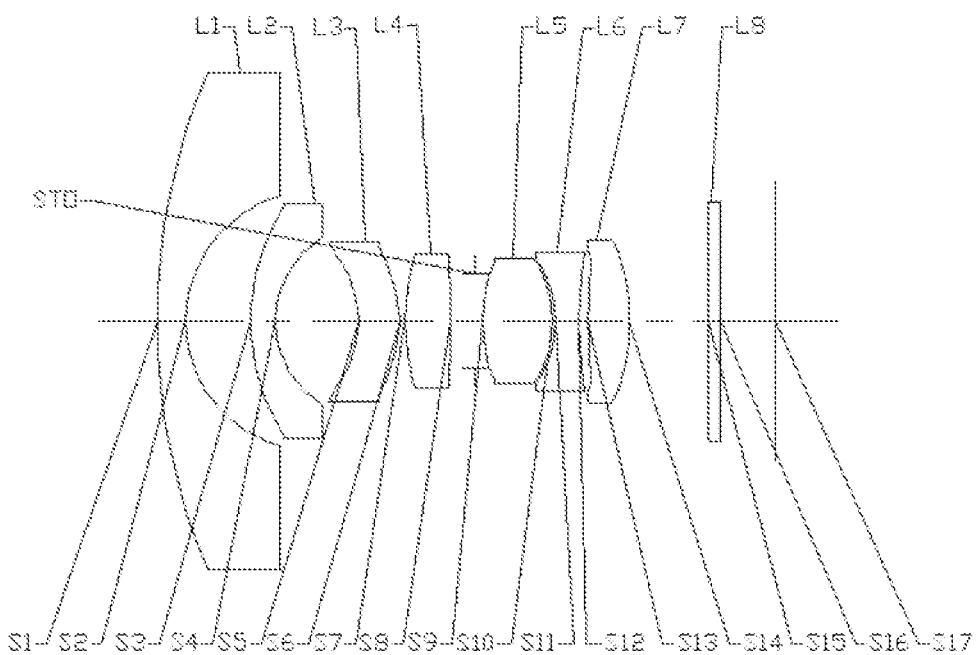
FIG. 6 is a structural schematic diagram of a wide-angle camera lens according to embodiment II.
Figure 7:
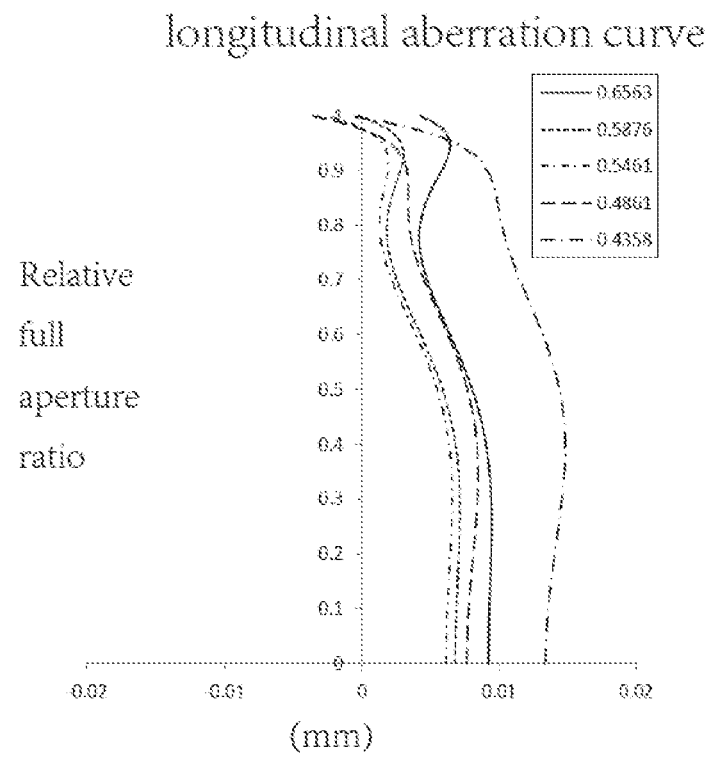
FIG. 7 is a longitudinal aberration diagram of the wide-angle camera lens according to embodiment II.
Figure 8:
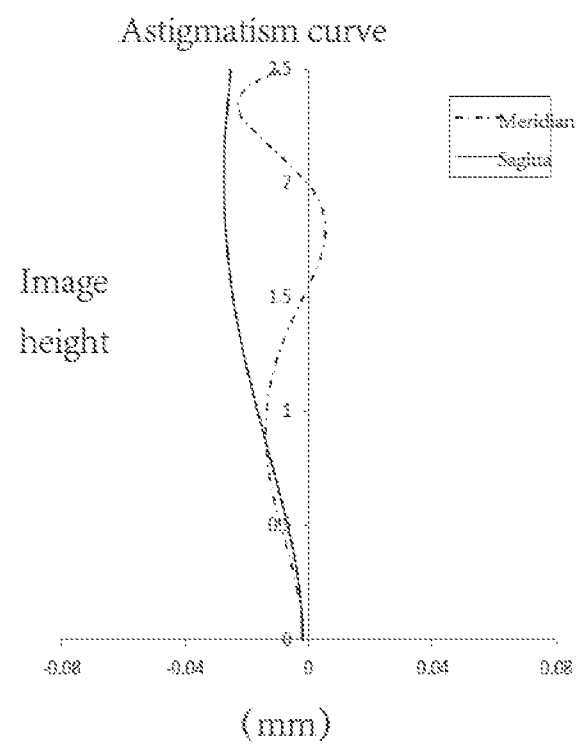
FIG. 8 is an astigmatism diagram of the wide-angle camera lens according to embodiment II.
Figure 9:
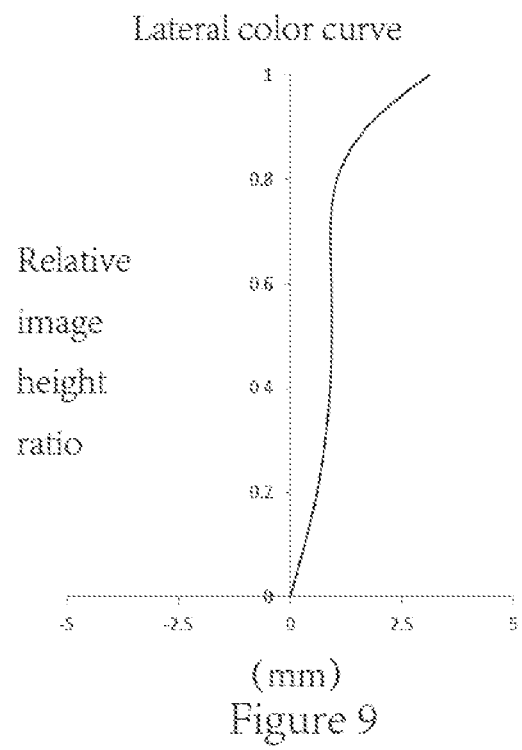
FIG. 9 is a lateral color diagram of the wide-angle camera lens according to embodiment II.
Figure 10:
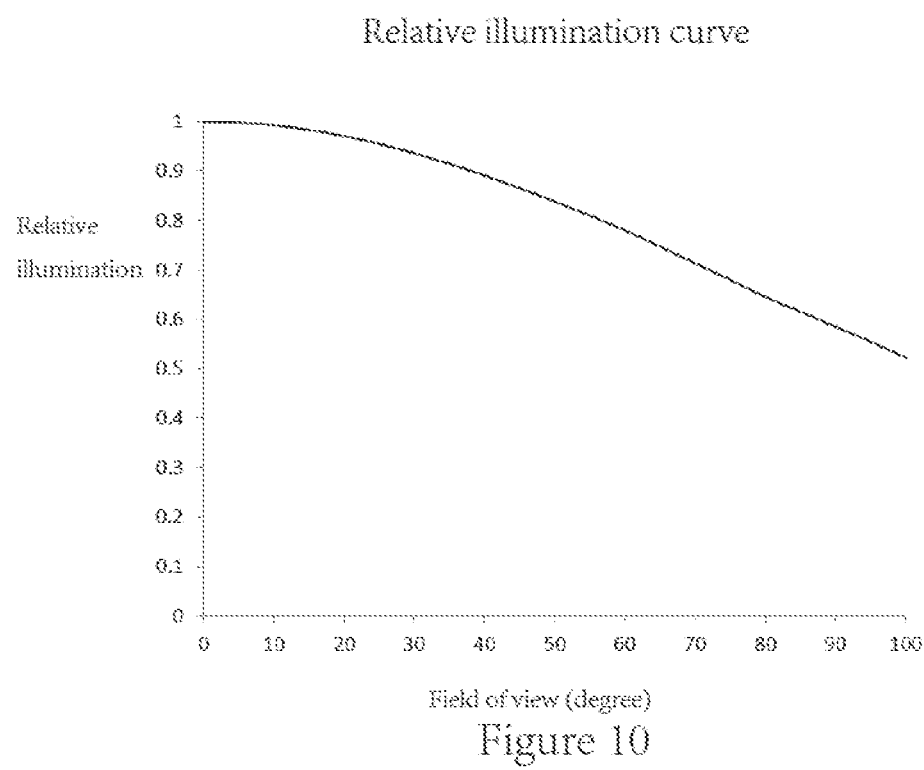
FIG. 10 is a relative illumination curve diagram of the wide-angle camera lens according to embodiment II.

Referring to FIG. 6, a wide-angle camera lens according to the present embodiment is successively provided with: a first optical lens L1 with negative refractive power, a second optical lens L2 with negative refractive power, a third optical lens L3 with negative refractive power, a fourth optical lens L4 with positive refractive power, a fifth optical lens L5 with positive refractive power, a sixth optical lens L6 with negative refractive power, a seventh optical lens L7 with positive refractive power, and a light filter L8 along an optical axis from an object side to an image side. The first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the light filter L8 has an object side surface S15 and an image side surface S16. An image side surface S17 of the wide-angle camera lens according to the present embodiment is disposed at an image side of the light filter L8, and can be used for mounting a photosensitive element.

Main design parameters of the wide-angle camera lens according to the present embodiment are shown in the following table:

| Name | Numerical value |
|---|---|
| Effective focal length of the first optical lens: f1(mm) | −4.80 |
| Effective focal length of the second optical lens: f2(mm) | −7.00 |
| Effective focal length of the third optical lens: f3(mm) | −126.06 |
| Effective focal length of the fourth optical lens: f4(mm) | 6.73 |
| Effective focal length of the fifth optical lens: f5(mm) | 1.87 |
| Effective focal length of the sixth optical lens: f6(mm) | −1.81 |
| Effective focal length of the seventh optical lens: f7(mm) | 4.50 |
| Effective focal length of the wide-angle camera lens: f(mm) | 1.66 |
| Axial distance from the object side surface of the first lens to an image side surface of the wide-angle lens: TTL (mm) | 11 |
| f1/f | −2.90 |
| f5/f6 | −1.03 |
| R5/R6 | 0.85 |
| DT11/DT72 | 3.05 |
| DT31/DT72 | 0.98 |
| ImgH × tan(FOV/3)/TTL | 0.53 |
| CT2/CT3 | 0.61 |
| ΣCT/TTL | 0.44 |
| T34 × 10/T23 | 0.68 | wherein R5 is a curvature radius of the object side surface of the third optical lens; R6 is a curvature radius of the image side surface of the third optical lens; DT11 is an effective radius of the object side surface of the first optical lens; DT72 is an effective radius of the image side surface of the seventh optical lens; DT31 is an effective radius of the object side surface of the third optical lens; ImgH is half of a diagonal line length of an effective pixel area of an electronic photosensitive element; FOV is a maximum field angle of an ultra-wide-angle lens; TTL is an axial distance from the object side surface of the first optical lens to an image side surface of the wide-angle lens; CT2 is a center thickness of the second optical lens on the optical axis; CT3 is a center thickness of the third optical lens on the optical axis; ΣCT is a sum of the center thicknesses of the first optical lens to the seventh optical lens on the optical axis; T34 is an axial spacing distance of the third optical lens and the fourth optical lens; and T23 is an axial spacing distance of the second optical lens and the third optical lens.

In order to realize the above design parameters, the specific design adopted by the wide-angle camera lens according to the present embodiment is shown in the following table:

| Surface number | Surface type | Curvature radius | Thickness | Material | Conic Coefficient |
|---|---|---|---|---|---|
| OBJ | Spherical surface | Infinity | Infinity | | |
| S1 | Spherical surface | 11.4109 | 0.5000 | 1.61/60.7 | |
| S2 | Spherical surface | 2.3052 | 1.1622 | | |
| S3 | Aspheric surface | 3.6398 | 0.4400 | 1.54/55.8 | 0.0000 |
| S4 | Aspheric surface | 1.7717 | 1.4809 | | 0.0000 |
| S5 | Aspheric surface | −1.7820 | 0.7238 | 1.54/55.8 | 0.0000 |
| S6 | Aspheric surface | −2.0900 | 0.1000 | | 0.0000 |
| S7 | Aspheric surface | 4.0106 | 0.7971 | 1.58/30.2 | 0.0000 |
| S8 | Aspheric surface | −247.4397 | 0.4500 | | 0.0000 |
| STO | Spherical surface | Infinity | 0.1309 | | |
| S9 | Spherical surface | 2.8218 | 1.2438 | 1.70/54.9 | |
| S10 | Spherical surface | −2.0178 | 0.0539 | | |
| S11 | Spherical surface | −1.9435 | 0.4200 | 1.85/23.8 | |
| S12 | Spherical surface | 8.3400 | 0.1561 | | |
| S13 | Aspheric surface | 4.7895 | 0.7360 | 1.54/55.8 | 2.6000 |
| S14 | Aspheric surface | −4.6300 | 1.3954 | | 0.0000 |
| S15 | Spherical surface | Infinity | 0.2100 | 1.52/64.2 | |
| S16 | Spherical surface | Infinity | 1.0000 | | |
| S17 | Spherical surface | Infinity | | | |

High-order term coefficients (A4, A6, A8, A10, A12 and A14) of the aspheric surfaces of aspheric lenses in the wide-angle camera lens according to the present embodiment are shown in the following table:

| Surface number | A4 | A6 | A8 | A10 | A12 | A14 |
|---|---|---|---|---|---|---|
| S3 | 1.5834E−03 | −8.7142E−04 | 2.4321E−05 | −1.2215E−05 | −6.4049E−21 | 0.0000E+00 |
| S4 | 6.9667E−03 | −1.4995E−03 | 1.0712E−03 | −5.9151E−05 | 0.0000E+00 | 0.0000E+00 |
| S5 | 1.5842E−02 | 3.5157E−03 | 5.2636E−03 | −3.0560E−04 | −2.2169E−07 | 0.0000E+00 |
| S6 | 7.6733E−03 | 1.3959E−02 | −2.0228E−03 | 1.5299E−03 | −8.8651E−07 | 0.0000E+00 |
| S7 | −1.8056E−02 | 5.0856E−03 | 4.2691E−04 | 2.7300E−03 | −1.9773E−17 | 0.0000E+00 |
| S8 | −2.4456E−02 | −7.2738E−03 | 1.0703E−02 | 1.9939E−03 | −1.9773E−17 | −2.6598E−19 |
| S13 | −4.3796E−02 | −1.3680E−02 | 3.1092E−03 | −4.1950E−03 | −9.2206E−05 | 0.0000E+00 |
| S14 | −7.8908E−04 | −5.8730E−03 | 2.8913E−03 | 1.2367E−04 | −6.9990E−06 | 0.0000E+00 |

The wide-angle camera lens according to the present embodiment well corrects off axis aberration, the brightness of an edge image surface, the distortion and the like on the basis of realizing an ultra-wide angle; and referring to FIGS. 7, 8, 9 and 10, good usability and high relative illumination are maintained while the miniaturization is realized.

Embodiment III

Figure 11:
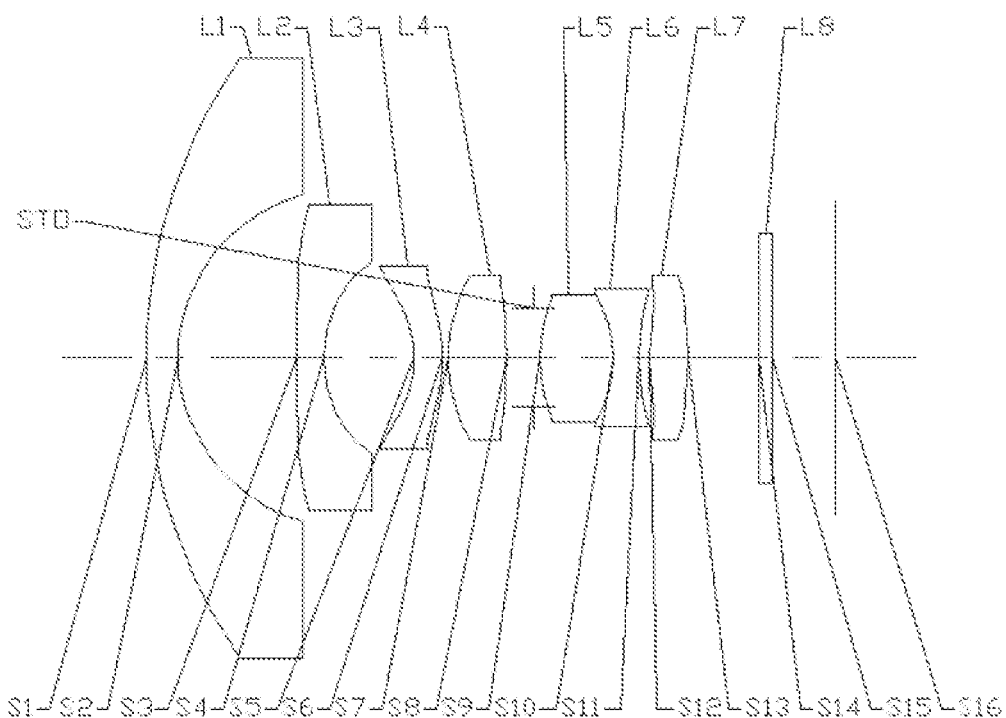
FIG. 11 is a structural schematic diagram of a wide-angle camera lens according to embodiment III.
Figure 12:
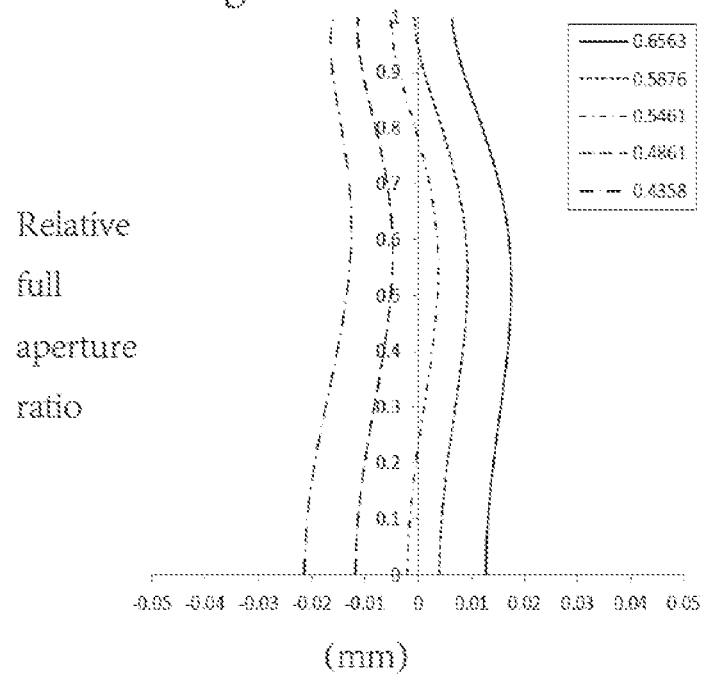
FIG. 12 is a longitudinal aberration diagram of the wide-angle camera lens according to embodiment III.
Figure 13:
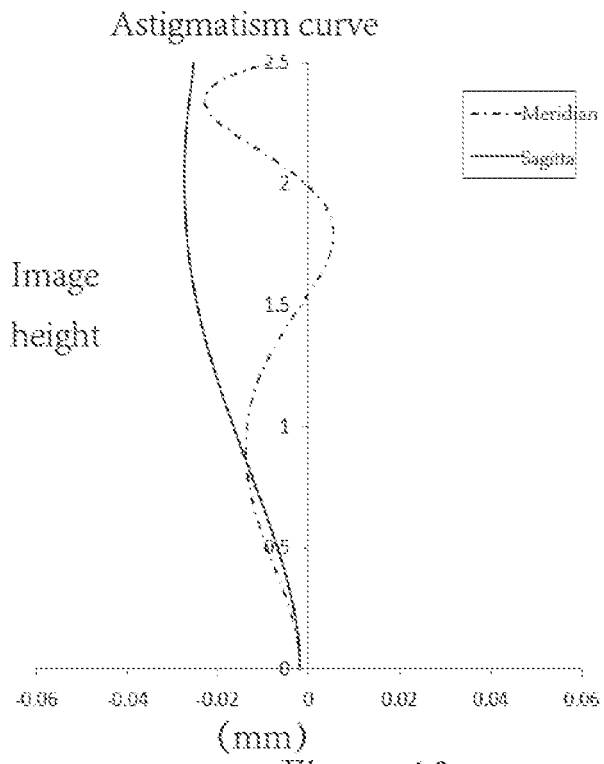
FIG. 13 is an astigmatism diagram of the wide-angle camera lens according to embodiment III.
Figure 14:
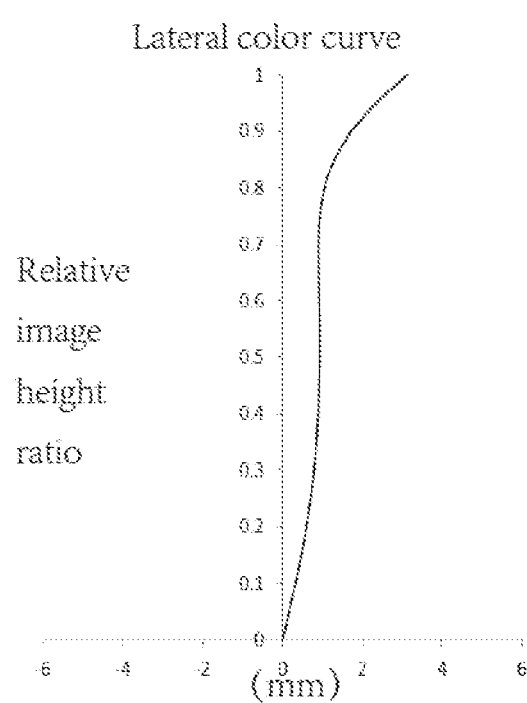
FIG. 14 is a lateral color diagram of the wide-angle camera lens according to embodiment III.
Figure 15:
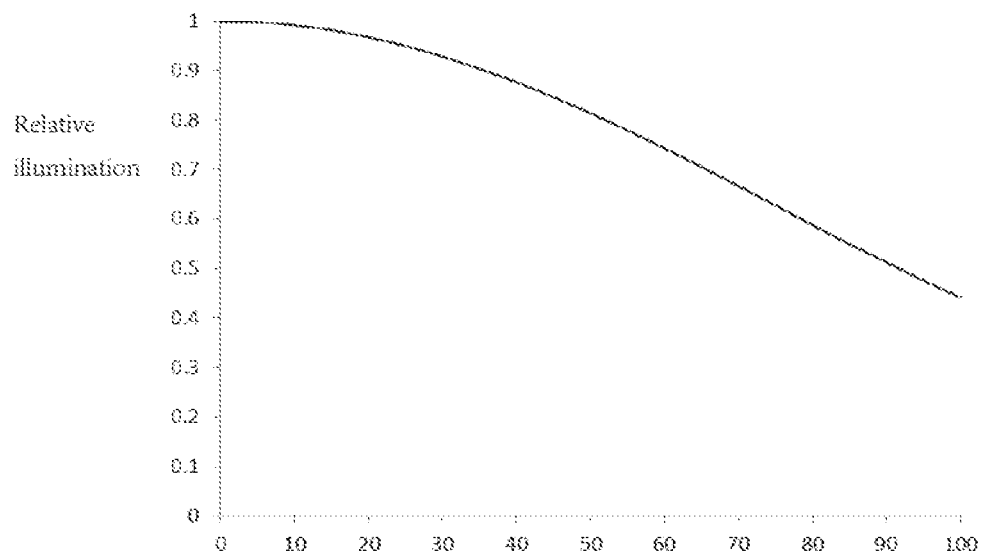
FIG. 15 is a relative illumination curve diagram of the wide-angle camera lens according to embodiment III.

Referring to FIG. 11, a wide-angle camera lens according to the present embodiment is successively provided with a first optical lens L1 with negative refractive power, a second optical lens L2 with negative refractive power, a third optical lens L3 with negative refractive power, a fourth optical lens L4 with positive refractive power, a fifth optical lens L5 with positive refractive power, a sixth optical lens L6 with negative refractive power, a seventh optical lens L7 with positive refractive power, and a light filter L8 along an optical axis from an object side to an image side. The first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S10 and an image side surface S11, the seventh optical lens L7 has an object side surface S12 and an image side surface S13, and the light filter L8 has an object side surface S14 and an image side surface S15. An image side surface S16 of the wide-angle camera optical lens according to the present embodiment is disposed at an image side of the light filter L8, and can be used for mounting a photosensitive element.

Main design parameters of the wide-angle camera lens according to the present embodiment are shown in the following table:

| Name | Numerical value |
|---|---|
| Effective focal length of the first optical lens: f1(mm) | −5.45 |
| Effective focal length of the second optical lens: f2(mm) | −4.15 |
| Effective focal length of the third optical lens: f3(mm) | −8.21 |
| Effective focal length of the fourth optical lens: f4(mm) | 3.38 |
| Effective focal length of the fifth optical lens: f5(mm) | 1.65 |
| Effective focal length of the sixth optical lens: f6(mm) | −1.51 |
| Effective focal length of the seventh optical lens: f7(mm) | 4.52 |

-continued

| Name | Numerical value |
|---|---|
| Effective focal length of the wide-angle camera optical | 1.41 |
| Axial distance from the object side surface of the first optical lens to an image side surface of the wide-angle lens: TTL (mm) | 11 |
| f1/f | −3.86 |
| f5/f6 | −1.09 |
| R5/R6 | 0.55 |
| DT11/DT72 | 3.63 |
| DT31/DT72 | 1.11 |
| ImgH × tan(FOV/3)/TTL | 0.53 |
| CT2/CT3 | 0.98 |
| ΣCT/TTL | 0.41 |
| T34 × 10/T23 | 0.70 | wherein R5 is a curvature radius of the object side surface of the third optical lens; R6 is a curvature radius of the image side surface of the third optical lens; DT11 is an effective radius of the object side surface of the first optical lens; DT72 is an effective radius of the image side surface of the seventh optical lens; DT31 is an effective radius of the object side surface of the third optical lens; ImgH is half of a diagonal line length of an effective pixel area of an electronic photosensitive element; FOV is a maximum field angle of an ultra-wide-angle lens; TTL is an axial distance from the object side surface of the first optical lens to an image side surface of the wide-angle lens; CT2 is a center thickness of the second optical lens on the optical axis; CT3 is a center thickness of the third optical lens on the optical axis; ΣCT is a sum of the center thicknesses of the first optical lens to the seventh optical lens on the optical axis; T34 is an axial spacing distance of the third optical lens and the fourth optical lens; and T23 is an axial spacing distance of the second optical lens and the third optical lens.

In order to realize the above design parameters, the specific design adopted by the wide-angle camera lens according to the present embodiment is shown in the following table:

| Surface number | Surface type | Curvature radius | Thickness | Material | Conic Coefficient |
|---|---|---|---|---|---|
| OBJ | Spherical surface | Infinity | Infinity | | |
| S1 | Spherical surface | 8.5003 | 0.5000 | 1.755/52.3 | |
| S2 | Spherical surface | 2.7101 | 1.9019 | | |
| S3 | Aspheric surface | −210.7690 | 0.4400 | 1.54/55.8 | 0.0000 |
| S4 | Aspheric surface | 2.2546 | 1.4279 | | 0.0000 |
| S5 | Aspheric surface | −1.7679 | 0.4500 | 1.54/55.8 | 0.0000 |
| S6 | Aspheric surface | −3.2119 | 0.1000 | | 0.0000 |
| S7 | Aspheric surface | 2.4957 | 0.9272 | 1.58/30.2 | 0.0000 |
| S8 | Aspheric surface | −8.3561 | 0.4433 | | 0.0000 |
| STO | Spherical surface | Infinity | 0.1000 | | |
| S9 | Spherical surface | 2.5226 | 1.1654 | 1.76/52.3 | |
| S10 | Spherical surface | −2.0000 | 0.0000 | | |
| S11 | Spherical surface | −2.0000 | 0.4200 | 1.85/23.8 | |
| S12 | Spherical surface | 4.0225 | 0.1586 | | |
| S13 | Aspheric surface | 3.6061 | 0.6114 | 1.54/55.8 | 2.6000 |
| S14 | Aspheric surface | −6.9815 | 1.1443 | | 0.0000 |
| S15 | Spherical surface | Infinity | 0.2100 | 1.52/64.2 | |
| S16 | Spherical surface | Infinity | 1.0000 | | |
| S17 | Spherical surface | Infinity | | | |

High-order term coefficients (A4, A6, A8, A10, A12 and A14) of the aspheric surfaces of aspheric lenses in the wide-angle camera lens according to the present embodiment are shown in the following table:

| Surface number | A4 | A6 | A8 | A10 | A12 | A14 |
|---|---|---|---|---|---|---|
| S3 | 6.7014E−03 | −2.1138E−04 | 0.0000E+00 | 0.0000E+00 | 0.0000E+00 | 0.0000E+00 |
| S4 | 1.2053E−02 | 4.0754E−03 | −7.1915E−04 | 1.0478E−03 | 0.0000E+00 | 0.0000E+00 |
| S5 | 9.2617E−02 | 1.0047E−02 | 3.9866E−03 | −2.0338E−04 | −2.2169E−07 | 0.0000E+00 |
| S6 | −1.6809E−02 | 1.5739E−02 | −1.3656E−03 | 1.8695E−03 | −8.8651E−07 | 0.0000E+00 |
| S7 | −1.7515E−02 | −8.6447E−05 | −3.4446E−04 | 1.8728E−03 | −1.9773E−17 | 0.0000E+00 |
| S8 | 1.4022E−02 | −2.1903E−02 | 8.8279E−03 | 2.8941E−04 | −1.9773E−17 | −2.6598E−19 |
| S13 | −4.7277E−02 | −3.1889E−02 | 2.2105E−02 | −1.8900E−02 | −9.2206E−05 | 0.0000E+00 |
| S14 | 1.2342E−02 | −9.6152E−04 | −1.1481E−02 | 2.2253E−03 | −6.9990E−06 | 0.0000E+00 |

The wide-angle camera lens according to the present embodiment well corrects off axis aberration, the brightness of an edge image surface, distortion and the like on the basis of realizing an ultra-wide angle; and referring to FIGS. 12, 13, 14 and 15, good usability and high relative illumination are maintained while the miniaturization is realized.

Embodiment IV

Figure 16:
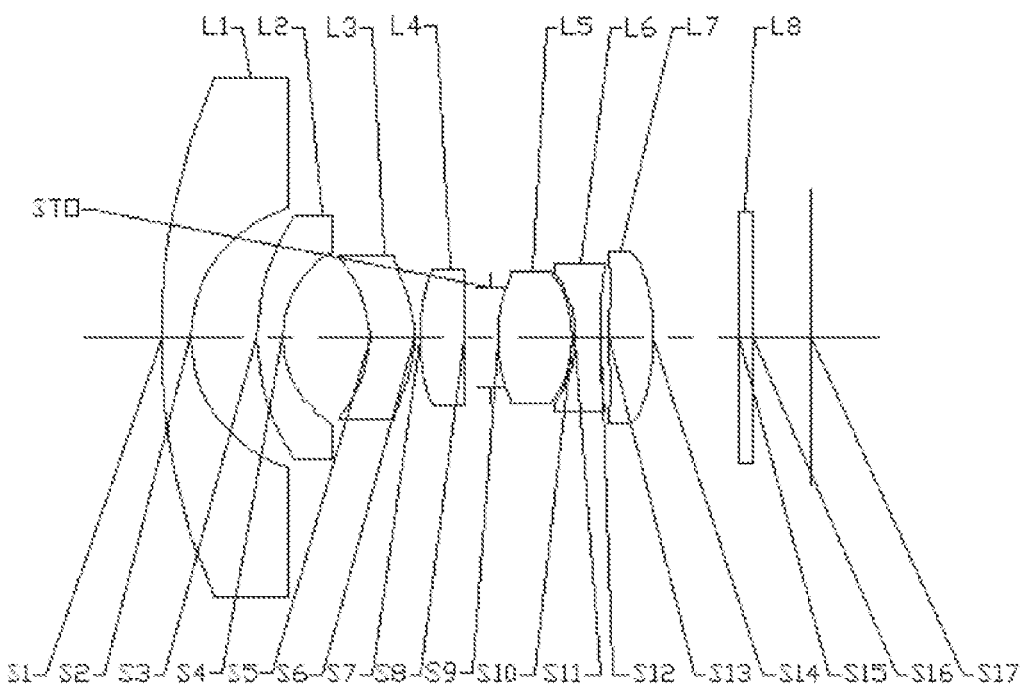
FIG. 16 is a structural schematic diagram of a wide-angle camera lens according to embodiment IV.
Figure 17:
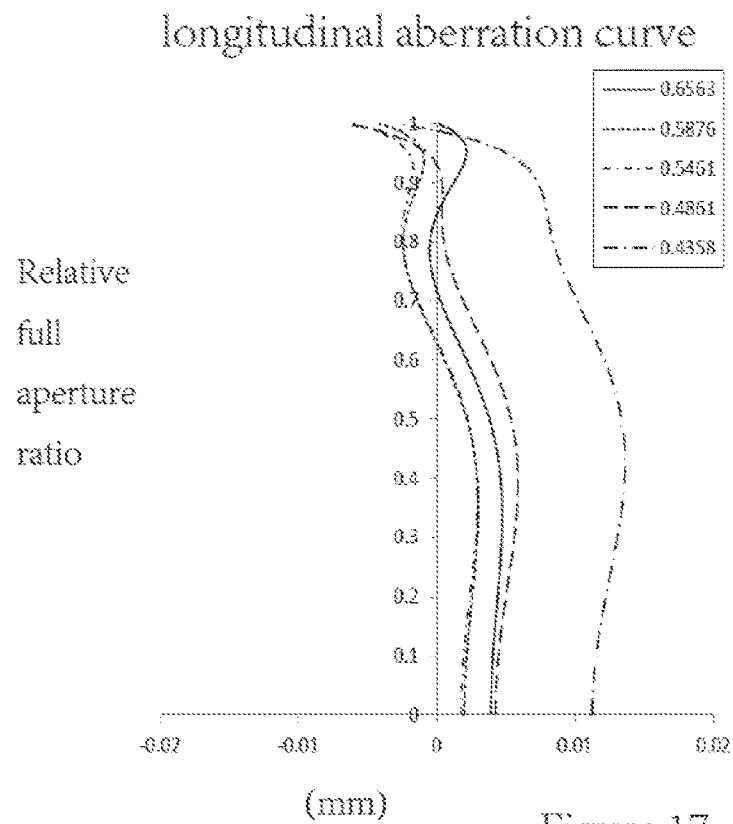
FIG. 17 is a longitudinal aberration diagram of the wide-angle camera lens according to embodiment IV.
Figure 18:
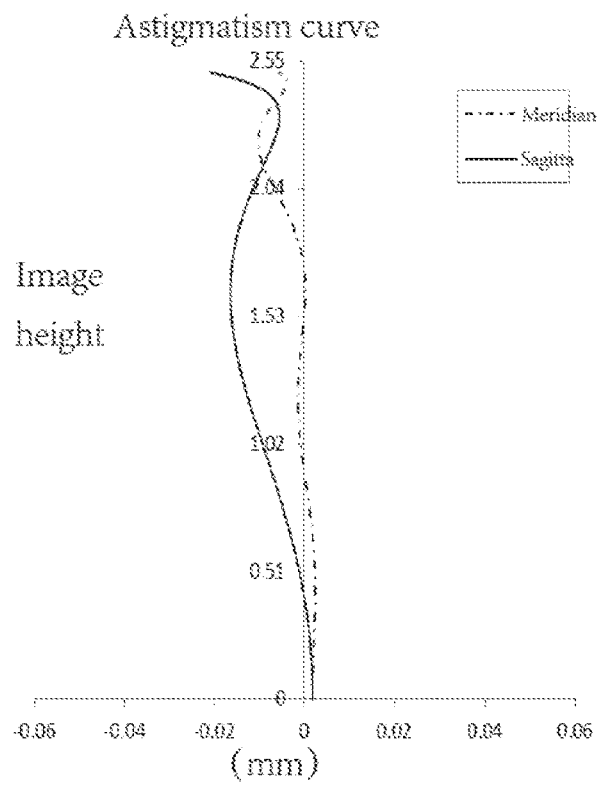
FIG. 18 is an astigmatism diagram of the wide-angle camera lens according to embodiment IV.
Figure 19:
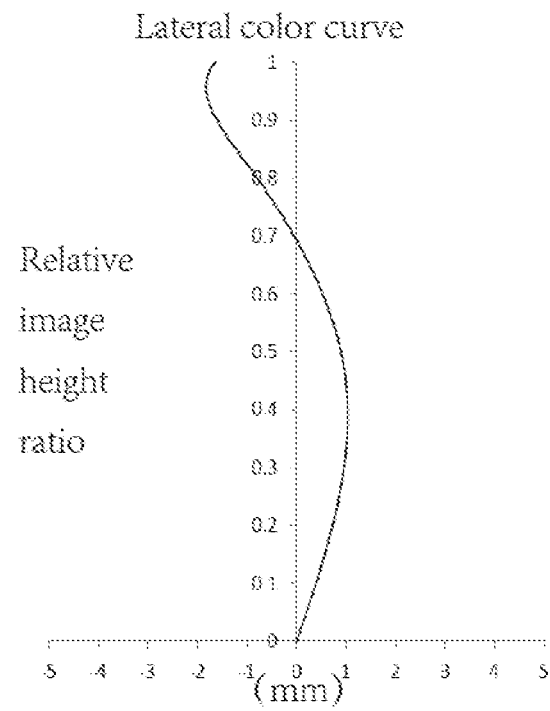
FIG. 19 is a lateral color diagram of the wide-angle camera lens according to embodiment IV.
Figure 20:
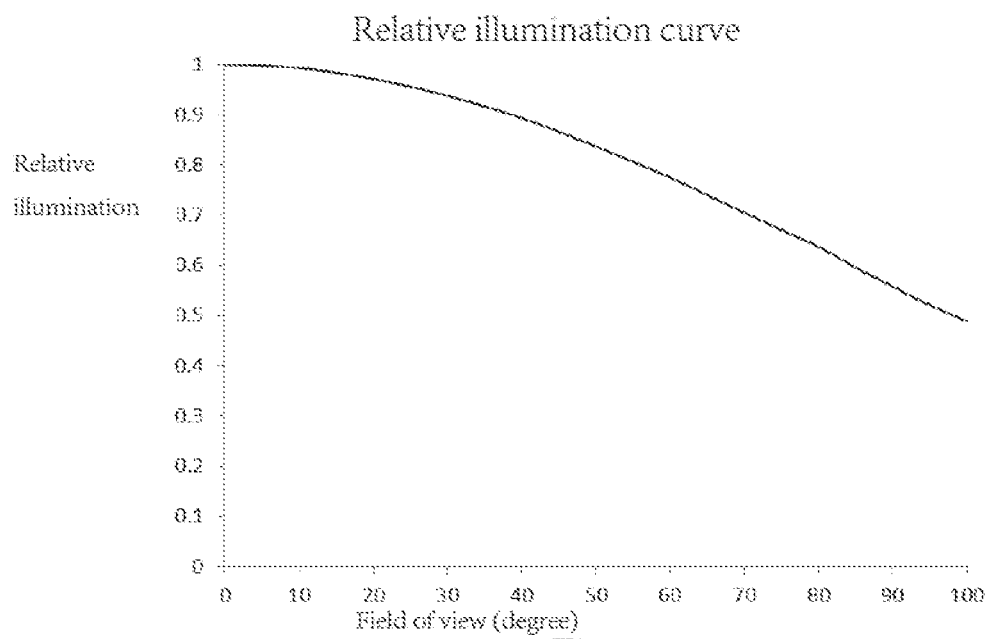
FIG. 20 is a relative illumination curve diagram of the wide-angle camera lens according to embodiment IV.

Referring to FIG. 16, a wide-angle camera lens according to the present embodiment is successively provided with: a first optical lens L1 with negative refractive power, a second optical lens L2 with negative refractive power, a third optical lens L3 with negative refractive power, a fourth optical lens L4 with positive refractive power, a fifth optical lens L5 with positive refractive power, a sixth optical lens L6 with negative refractive power, a seventh optical lens L7 with positive refractive power, and a light filter L8 along an optical axis from an object side to an image side. The first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the light filter L8 has an object side surface S15 and an image side surface S16. An image side surface S17 of the wide-angle camera optical lens according to the present embodiment is disposed at an image side of the light filter L8, and can be used for mounting a photosensitive element.

Main design parameters of the wide-angle camera optical lens according to the present embodiment are shown in the following table:

| Name | Numerical value |
|---|---|
| Effective focal length of the first optical lens: f1(mm) | −4.77 |
| Effective focal length of the second optical lens: f2(mm) | −7.00 |
| Effective focal length of the third optical lens: f3(mm) | −76.28 |
| Effective focal length of the fourth optical lens: f4(mm) | 6.54 |
| Effective focal length of the fifth optical lens: f5(mm) | 1.90 |
| Effective focal length of the sixth optical lens: f6(mm) | −1.81 |
| Effective focal length of the seventh optical lens: f7(mm) | 4.32 |
| Effective focal length of the wide-angle camera optical lens: f(mm) | 1.66 |
| Axial distance from the object side surface of the first optical lens to an image side surface of the wide-angle lens: TTL (mm) | 11 |
| f1/f | −2.88 |
| f5/f6 | −1.05 |
| R5/R6 | 0.83 |
| DT11/DT72 | 3.02 |
| DT31/DT72 | 0.96 |
| ImgH × tan(FOV/3)/TTL | 0.53 |
| CT2/CT3 | 0.58 |
| ΣCT/TTL | 0.44 |
| T34 × 10/T23 | 0.68 | wherein R5 is a curvature radius of the object side surface of the third optical lens; R6 is a curvature radius of the image side surface of the third optical lens; DT11 is an effective radius of the object side surface of the first optical lens; DT72 is an effective radius of the image side surface of the seventh optical lens; DT31 is an effective radius of the object side surface of the third optical lens; ImgH is half of a diagonal line length of an effective pixel area of an electronic photosensitive element; FOV is a maximum field angle of an ultra-wide-angle lens; TTL is an axial distance from the object side surface of the first optical lens to an image side surface of the wide-angle lens; CT2 is a center thickness of the second optical lens on the optical axis; CT3 is a center thickness of the third optical lens on the optical axis; ΣCT is a sum of the center thicknesses of the first optical lens to the seventh optical lens on the optical axis; T34 is an axial spacing distance of the third optical lens and the fourth optical lens; and T23 is an axial spacing distance of the second optical lens and the third optical lens.

In order to realize the above design parameters, the specific design adopted by the wide-angle camera lens according to the present embodiment is shown in the following table:

| Surface number | Surface type | Curvature radius | Thickness | Material | Conic Coefficient |
|---|---|---|---|---|---|
| OBJ | Spherical surface | Infinity | Infinity | | |
| S1 | Spherical surface | 11.4267 | 0.5000 | 1.61/60.8 | |
| S2 | Spherical surface | 2.2891 | 1.1195 | | |
| S3 | Aspheric surface | 3.5767 | 0.4400 | 1.54/55.8 | 0.0000 |
| S4 | Aspheric surface | 1.7546 | 1.4679 | | 0.0000 |
| S5 | Aspheric surface | −1.7560 | 0.7648 | 1.54/55.8 | 0.0000 |
| S6 | Aspheric surface | −2.1139 | 0.1000 | | 0.0000 |
| S7 | Aspheric surface | 3.7595 | 0.7446 | 1.53/30.2 | 0.0000 |
| S8 | Aspheric surface | 168.5735 | 0.4339 | | 0.0000 |
| STO | Spherical surface | Infinity | 0.1371 | | |
| S9 | Spherical surface | 2.8880 | 1.2454 | 1.69/55.8 | |
| S10 | Spherical surface | −1.9694 | 0.0542 | | |
| S11 | Spherical surface | −1.8985 | 0.4200 | 1.85/23.8 | |
| S12 | Spherical surface | 9.2495 | 0.1407 | | |
| S13 | Aspheric surface | 5.0514 | 0.7617 | 1.54/55.8 | 2.6000 |
| S14 | Aspheric surface | −4.0612 | 1.4602 | | 0.0000 |
| S15 | Spherical surface | Infinity | 0.2100 | 1.52/64.2 | |
| S16 | Spherical surface | Infinity | 1.0000 | | |
| S17 | Spherical surface | Infinity | | | |

High-order term coefficients (A4, A6, A8, A10, A12 and A14) of the aspheric surfaces of aspheric lenses in the wide-angle camera lens according to the present embodiment are shown in the following table:

| Surface number | A4 | A6 | A8 | A10 | A12 | A14 |
|---|---|---|---|---|---|---|
| S3 | 3.0023E−03 | −1.2149E−03 | 7.7378E−05 | −7.8677E−06 | −6.8435E−21 | 0.0000E+00 |
| S4 | 8.2892E−03 | −1.6168E−03 | 6.1613E−04 | 7.5970E−05 | 0.0000E+00 | 0.0000E+00 |
| S5 | 1.8837E−02 | 3.2721E−03 | 5.2275E−03 | −2.3066E−04 | −2.2169E−07 | 0.0000E+00 |
| S6 | 1.0374E−02 | 1.3618E−02 | −2.1759E−03 | 1.7961E−03 | −8.8651E−07 | 0.0000E+00 |
| S7 | −1.7194E−02 | 5.6786E−03 | −2.8788E−04 | 3.9671E−03 | −1.9773E−17 | 0.0000E+00 |
| S8 | −2.4941E−02 | −6.3462E−03 | 9.9009E−03 | 3.7088E−03 | −1.9773E−17 | −2.6598E−19 |
| S13 | −4.2258E−02 | −1.0207E−02 | 2.1715E−03 | −3.4427E−03 | −9.2206E−05 | 0.0000E+00 |
| S14 | −3.0351E−05 | −5.1542E−03 | −1.8092E−03 | −2.1091E−04 | −6.9990E−06 | 0.0000E+00 |

The wide-angle camera lens according to the present embodiment well corrects off axis aberration, the brightness of an edge image surface, distortion and the like on the basis of realizing an ultra-wide angle; and referring to FIGS. 17, 18, 19 and 20, good usability and high relative illumination are maintained while the miniaturization is realized.

Embodiment V

Figure 21:
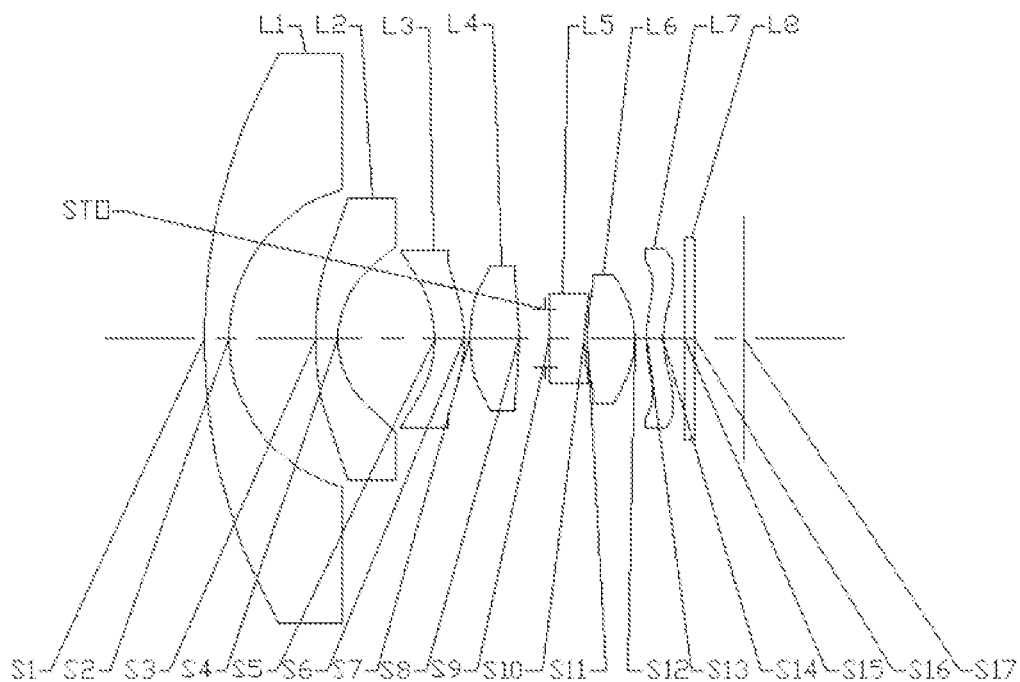
FIG. 21 is a structural schematic diagram of a wide-angle camera lens according to embodiment V.
Figure 22:
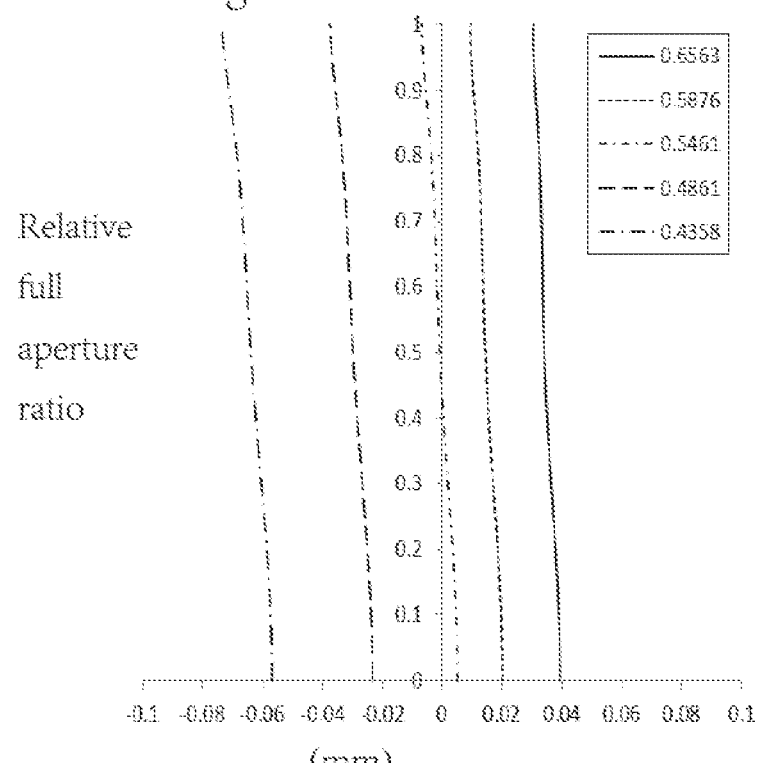
FIG. 22 is a longitudinal aberration diagram of the wide-angle camera lens according to embodiment V.
Figure 23:
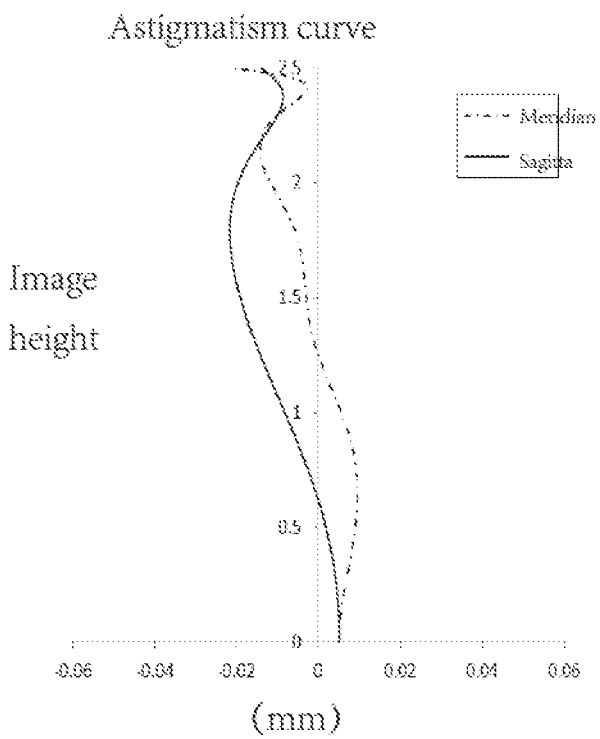
FIG. 23 is an astigmatism diagram of the wide-angle camera lens according to embodiment V.
Figure 24:
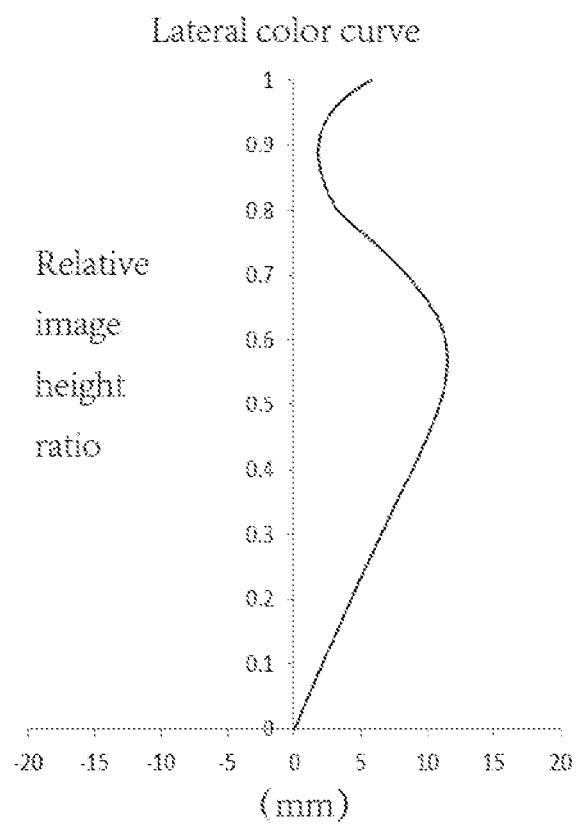
FIG. 24 is a lateral color diagram of the wide-angle camera lens according to embodiment V.
Figure 25:
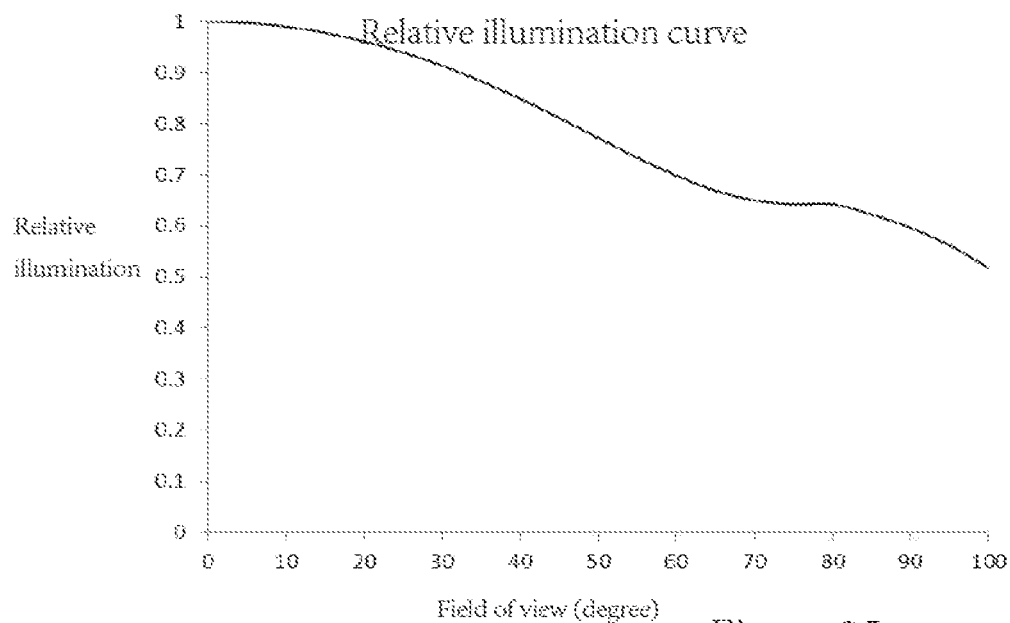
FIG. 25 is a relative illumination curve diagram of the wide-angle camera lens according to embodiment V.

Referring to FIG. 21, a wide-angle camera lens according to the present embodiment is successively provided with: a first optical lens L1 with negative refractive power, a second optical lens L2 with negative refractive power, a third optical lens L3 with negative refractive power, a fourth optical lens L4 with positive refractive power, a fifth optical lens L5 with negative refractive power, a sixth optical lens L6 with positive refractive power, a seventh optical lens L7 with negative refractive power, and a light filter L8 along an optical axis from an object side to an image side. The first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the light filter L8 has an object side surface S15 and an image side surface S16. An image side surface S17 of the wide-angle camera optical lens according to the present embodiment is disposed at an image side of the light filter L8, and can be used for mounting a photosensitive element.

Main design parameters of the wide-angle camera lens according to the present embodiment are shown in the following table:

| Name | Numerical value |
| --- | --- |
| Effective focal length of the first optical lens: f1(mm) | −7.05 |
| Effective focal length of the second optical lens: f2(mm) | −4.85 |
| Effective focal length of the third optical lens: f3(mm) | −28.34 |
| Effective focal length of the fourth optical lens: f4(mm) | 2.75 |
| Effective focal length of the fifth optical lens: f5(mm) | −5.99 |
| Effective focal length of the sixth optical lens: f6(mm) | 2.93 |
| Effective focal length of the seventh optical lens: f7(mm) | −23.95 |
| Effective focal length of the wide-angle camera optical lens: | 1.36 |
| Axial distance from the object side surface of the first optical lens to an image side surface of the wide-angle lens: TTL (mm) | 11 |
| f1/f | −5.18 |
| f5/f6 | −2.04 |
| R5/R6 | 0.78 |
| DT11/DT72 | 3.18 |
| DT31/DT72 | 0.99 |
| ImgH × tan(FOV/3)/TTL | 0.53 |
| CT2/CT3 | 0.73 |
| ΣCT/TTL | 0.41 |
| T34 × 10/T23 | 0.51 | wherein R5 is a curvature radius of the object side surface of the third optical lens; R6 is a curvature radius of the image side surface of the third optical lens; DT11 is an effective radius of the object side surface of the first optical lens; DT72 is an effective radius of the image side surface of the seventh optical lens; DT31 is an effective radius of the object side surface of the third optical lens; ImgH is half of a diagonal line length of an effective pixel area of an electronic photosensitive element; FOV is a maximum field angle of an ultra-wide-angle lens; TTL is an axial distance from the object side surface of the first optical lens to an image side surface of the wide-angle lens; CT2 is a center thickness of the second optical lens on the optical axis; CT3 is a center thickness of the third optical lens on the optical axis; ΣCT is a sum of the center thicknesses of the first optical lens to the seventh optical lens on the optical axis; T34 is an axial spacing distance of the third optical lens and the fourth optical lens; and T23 is an axial spacing distance of the second optical lens and the third optical lens.

In order to realize the above design parameters, the specific design adopted by the wide-angle camera lens according to the present embodiment is shown in the following table:

| Surface number | Surface type | Curvature radius | Thickness | Material | Conic Coefficient |
| --- | --- | --- | --- | --- | --- |
| OBJ | Spherical surface | Infinity | Infinity | | |
| S1 | Spherical surface | 11.9027 | 0.5000 | 1.62/60.3 | |
| S2 | Spherical surface | 3.1536 | 1.7854 | | |
| S3 | Aspheric surface | 9.3703 | 0.4400 | 1.54/55.8 | 0.0000 |
| S4 | Aspheric surface | 2.0043 | 1.9673 | | 0.0000 |
| S5 | Aspheric surface | −2.2746 | 0.6055 | 1.54/55.8 | 0.0000 |
| S6 | Aspheric surface | −2.9227 | 0.1000 | | 0.0000 |
| S7 | Spherical surface | 2.7474 | 1.0065 | 1.81/39.8 | |
| S8 | Spherical surface | −10.2785 | 0.5371 | | |
| STO | Spherical surface | Infinity | 0.1000 | | |
| S9 | Aspheric surface | 46.2802 | 0.7000 | 1.85/23.8 | 0.0000 |
| S10 | Spherical surface | 4.5837 | 0.0500 | | |
| S11 | Spherical surface | 4.5233 | 0.9710 | 1.49/70.4 | |
| S12 | Aspheric surface | −1.9515 | 0.2543 | | 0.0000 |
| S13 | Aspheric surface | 2.5979 | 0.3318 | 1.54/55.8 | 0.0000 |
| S14 | Aspheric surface | 2.0651 | 0.4412 | | 0.0000 |
| S15 | Spherical surface | Infinity | 0.2100 | 1.52/64.2 | |
| S16 | Spherical surface | Infinity | 1.0000 | | |
| S17 | Spherical surface | Infinity | | | |

High-order term coefficients (A4, A6, A8, A10, A12 and A14) of the aspheric surfaces of aspheric lenses in the wide-angle camera lens according to the present embodiment are shown in the following table:

| Surface number | A4 | A6 | A8 | A10 | A12 | A14 |
|---|---|---|---|---|---|---|
| S3 | 1.6155E−02 | −1.6940E−03 | −1.2775E−04 | 1.6437E−05 | 2.0988E−14 | 1.0990E−17 |
| S4 | 1.7548E−02 | 4.8964E−04 | 3.9238E−05 | −7.4747E−04 | −2.1552E−17 | 0.0000E+00 |
| S5 | −3.4920E−03 | 5.3732E−03 | 7.4619E−04 | −8.7950E−05 | −2.7806E−07 | 0.0000E+00 |
| S6 | 3.8550E−03 | 5.3892E−03 | 2.4961E−04 | 1.2507E−04 | −8.1182E−07 | 0.0000E+00 |
| S9 | −1.5815E−02 | −3.0148E−02 | 7.3348E−02 | −7.5136E−02 | 1.6993E−22 | 0.0000E+00 |
| S12 | 1.9177E−02 | −2.0486E−03 | 9.7747E−03 | −3.0219E−03 | −7.0789E−19 | 1.8021E−24 |
| S13 | −9.1461E−02 | 2.3735E−03 | −3.4082E−04 | −5.6764E−05 | 3.0749E−18 | 0.0000E+00 |
| S14 | −9.4021E−02 | 3.7748E−03 | −4.2366E−04 | −2.6532E−04 | 3.0282E−17 | 0.0000E+00 |

The wide-angle camera lens according to the present embodiment well corrects off axis aberration, the brightness of an edge image surface, distortion and the like on the basis of realizing an ultra-wide angle; and referring to FIGS. 22, 23, 24 and 25, good usability and high relative illumination are maintained while the miniaturization is realized.

Embodiment VI

Figure 26:
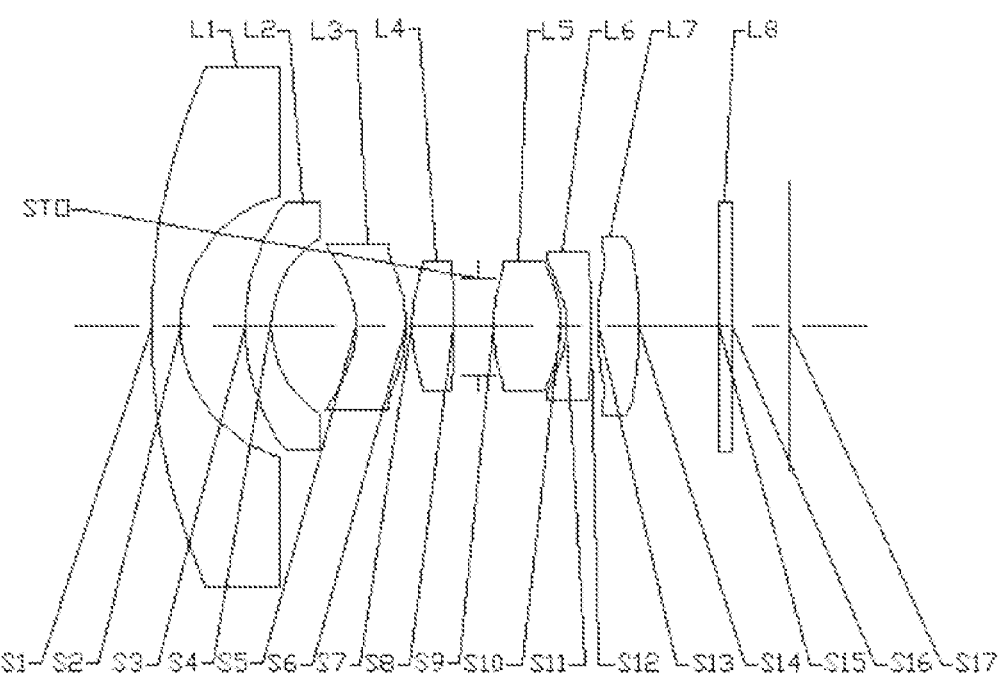
FIG. 26 is a structural schematic diagram of a wide-angle camera lens according to embodiment VI.
Figure 27:
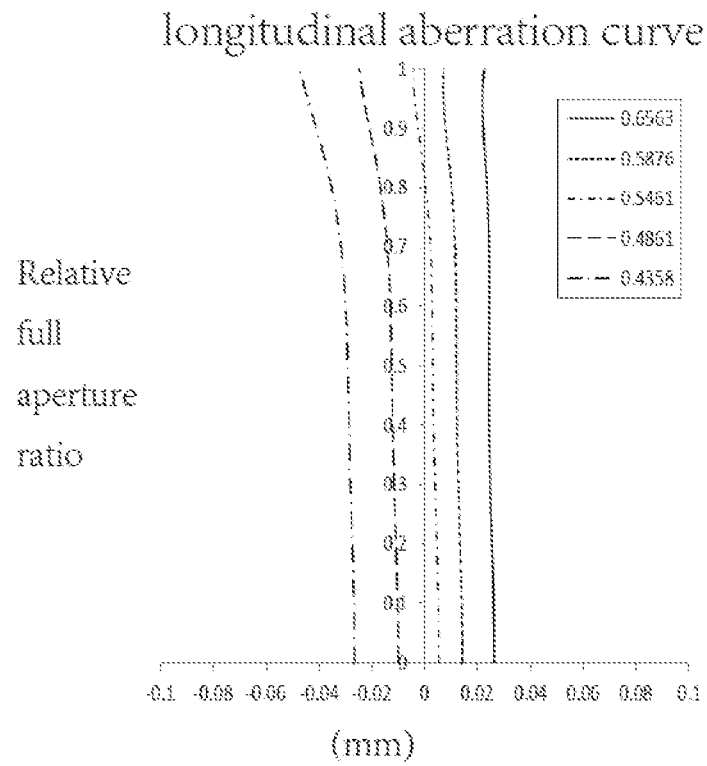
FIG. 27 is a longitudinal aberration diagram of a wide-angle camera lens according to embodiment VI.
Figure 28:
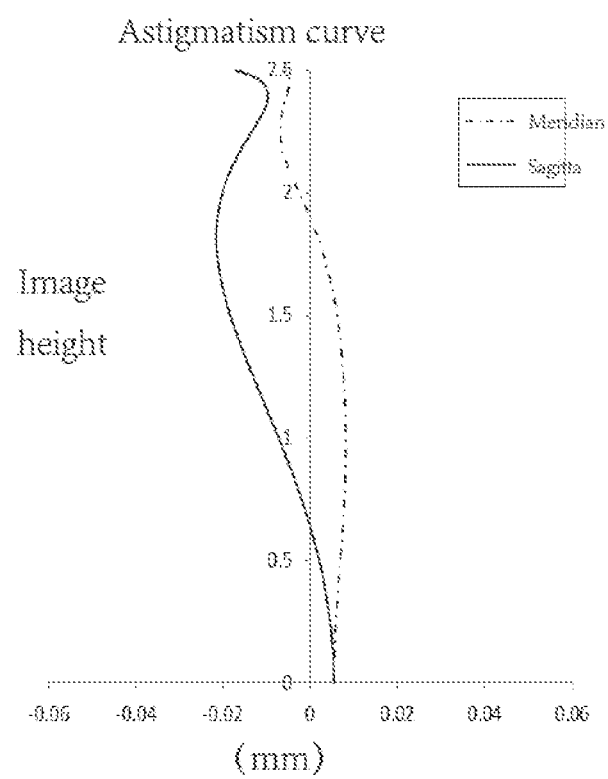
FIG. 28 is an astigmatism diagram of a wide-angle camera lens according to embodiment VI.
Figure 29:
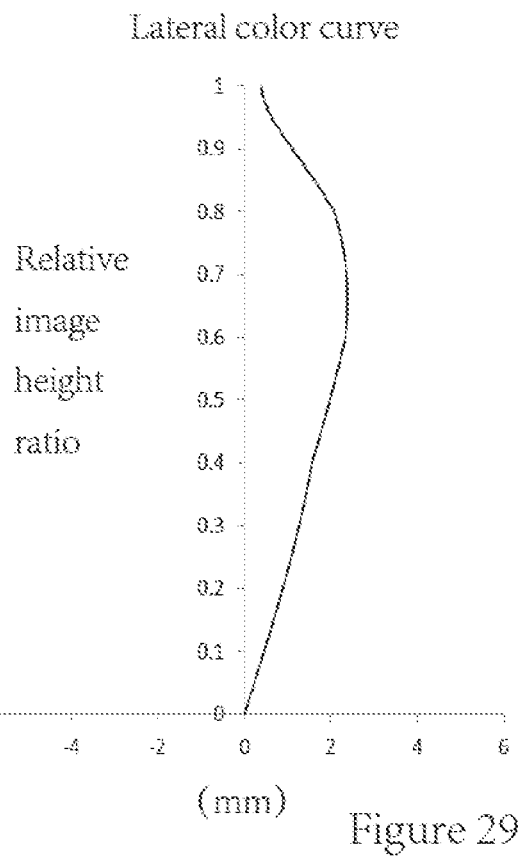
FIG. 29 is a lateral colordiagram of a wide-angle camera lens according to embodiment VI.
Figure 30:
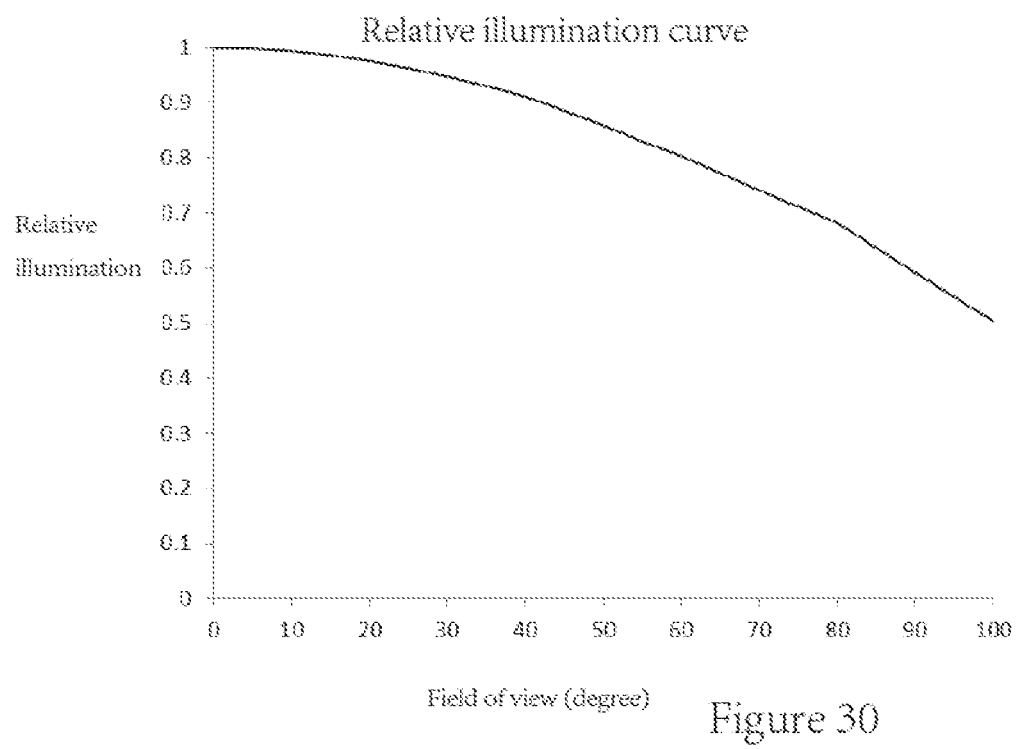
FIG. 30 is a relative illumination curve diagram of a wide-angle camera lens according to embodiment VI.

Referring to FIG. 26, a wide-angle camera lens according to the present embodiment is successively provided with: a first optical lens L1 with negative refractive power, a second optical lens L2 with negative refractive power, a third optical lens L3 with negative refractive power, a fourth optical lens L4 with positive refractive power, a fifth optical lens L5 with positive refractive power, a sixth optical lens L6 with negative refractive power, a seventh optical lens L7 with positive refractive power, and a light filter L8 along an optical axis from an object side to an image side. The first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the light filter L8 has an object side surface S15 and an image side surface S16. An image side surface S17 of the wide-angle camera lens according to the present embodiment is disposed at an image side of the light filter L8, and can be used for mounting a photosensitive element.

Main design parameters of the wide-angle camera lens according to the present embodiment are shown in the following table:

| Name | Numerical value |
|---|---|
| Effective focal length of the first optical lens: f1(mm) | −4.88 |
| Effective focal length of the second optical lens: f2(mm) | −6.98 |
| Effective focal length of the third optical lens: f3(mm) | −29.52 |
| Effective focal length of the fourth optical lens: f4(mm) | 4.91 |
| Effective focal length of the fifth optical lens: f5(mm) | 2.45 |
| Effective focal length of the sixth optical lens: f6(mm) | −2.44 |
| Effective focal length of the seventh optical lens: f7(mm) | 4.75 |
| Effective focal length of the wide-angle camera optical | 1.67 |
| Axial distance from the object side surface of the first optical lens to an image side surface of the wide-angle lens: TTL (mm) | 11 |
| f1/f | −2.93 |
| f5/f6 | −1.01 |

| Name | Numerical value |
|---|---|
| R5/R6 | 0.76 |
| DT11/DT72 | 2.89 |
| DT31/DT72 | 0.92 |
| ImgH × tan(FOV/3)/TTL | 0.53 |
| CT2/CT3 | 0.51 |
| ΣCT/TTL | 0.44 |
| T34 × 10/T23 | 0.68 | wherein R5 is a curvature radius of the object side surface of the third optical lens; R6 is a curvature radius of the image side surface of the third optical lens; DT11 is an effective radius of the object side surface of the first optical lens; DT72 is an effective radius of the image side surface of the seventh optical lens; DT31 is an effective radius of the object side surface of the third optical lens; ImgH is half of a diagonal line length of an effective pixel area of an electronic photosensitive element; FOV is a maximum field angle of an ultra-wide-angle lens; TTL is an axial distance from the object side surface of the first optical lens to an image side surface of the wide-angle lens; CT2 is a center thickness of the second optical lens on the optical axis; CT3 is a center thickness of the third optical lens on the optical axis; ΣCT is a sum of the center thicknesses of the first optical lens to the seventh optical lens on the optical axis; T34 is an axial spacing distance of the third optical lens and the fourth optical lens; and T23 is an axial spacing distance of the second optical lens and the third optical lens.

In order to realize the above design parameters, the specific design adopted by the wide-angle camera lens according to the present embodiment is shown in the following table:

| Surface number | Surface type | Curvature radius | Thickness | Material | Conic Coefficient |
|---|---|---|---|---|---|
| OBJ | Spherical surface | Infinity | Infinity | | |
| S1 | Spherical surface | 11.1124 | 0.5000 | 1.62/60.3 | |
| S2 | Spherical surface | 2.3458 | 1.1218 | | |
| S3 | Spherical surface | 3.6726 | 0.4400 | 1.54/55.8 | |
| S4 | Spherical surface | 1.7782 | 1.4659 | | |
| S5 | Aspheric surface | −1.8360 | 0.8606 | 1.54/55.8 | 0.0000 |
| S6 | Aspheric surface | −2.4165 | 0.1000 | | 0.0000 |
| S7 | Aspheric surface | 3.0192 | 0.7133 | 1.58/30.2 | 0.0000 |
| S8 | Aspheric surface | −58.1329 | 0.4389 | | 0.0000 |

-continued

| Surface number | Surface type | Curvature radius | Thickness | Material | Conic Coefficient |
|---|---|---|---|---|---|
| STO | Spherical surface | Infinity | 0.2560 | | |
| S9 | Aspheric surface | 3.2659 | 1.1563 | 1.60/61.7 | 0.0000 |
| S10 | Spherical surface | −2.2994 | 0.0863 | | |
| S11 | Spherical surface | −2.0776 | 0.4200 | 1.85/23.8 | |
| S12 | Aspheric surface | −1000.9860 | 0.1286 | | 0.0000 |
| S13 | Aspheric surface | 3.4202 | 0.7053 | 1.54/55.8 | 2.6000 |
| S14 | Aspheric surface | −9.3608 | 1.3970 | | 0.0000 |
| S15 | Spherical surface | Infinity | 0.2100 | 1.52/64.2 | |
| S16 | Spherical surface | Infinity | 1.0000 | | |
| S17 | Spherical surface | Infinity | | | |

High-order term coefficients (A4, A6, A8, A10, A12 and A14) of the aspheric surfaces of aspheric lenses in the wide-angle camera lens according to the present embodiment are shown in the following table:

| Surface number | A4 | A6 | A8 | A10 | A12 | A14 |
|---|---|---|---|---|---|---|
| S5 | 1.1677E−02 | 4.4834E−03 | 5.2557E−03 | −6.5426E−04 | −2.7806E−07 | 0.0000E+00 |
| S6 | −1.0124E−03 | 1.4319E−02 | −1.8970E−03 | 1.4122E−03 | −8.1182E−07 | 0.0000E+00 |
| S7 | −2.0048E−02 | −3.0944E−03 | −2.0360E−03 | 1.3879E−03 | −1.8161E−08 | 0.0000E+00 |
| S8 | −1.3486E−02 | −2.2102E−02 | 5.7307E−03 | 1.3460E−03 | 1.0054E−08 | 3.8948E−09 |
| S9 | 1.1366E−02 | −1.0065E−02 | 5.0274E−03 | −1.0196E−03 | 6.8894E−08 | 0.0000E+00 |
| S12 | −6.3464E−03 | 0.0000E+00 | 0.0000E+00 | 0.0000E+00 | 0.0000E+00 | 0.0000E+00 |
| S13 | −4.7043E−02 | −8.6944E−03 | 6.2672E−04 | −1.8790E−03 | −9.2232E−05 | 0.0000E+00 |
| S14 | 1.1560E−02 | −1.0518E−02 | −2.4558E−04 | −2.4367E−04 | −6.9988E−06 | 0.0000E+00 |

The wide-angle camera lens according to the present embodiment well corrects off axis aberration, the brightness of an edge image surface, distortion and the like on the basis of realizing an ultra-wide angle; and referring to FIGS. 27, 28, 29 and 30, good usability and high relative illumination are maintained while the miniaturization is realized.

Embodiment VII

Figure 31:
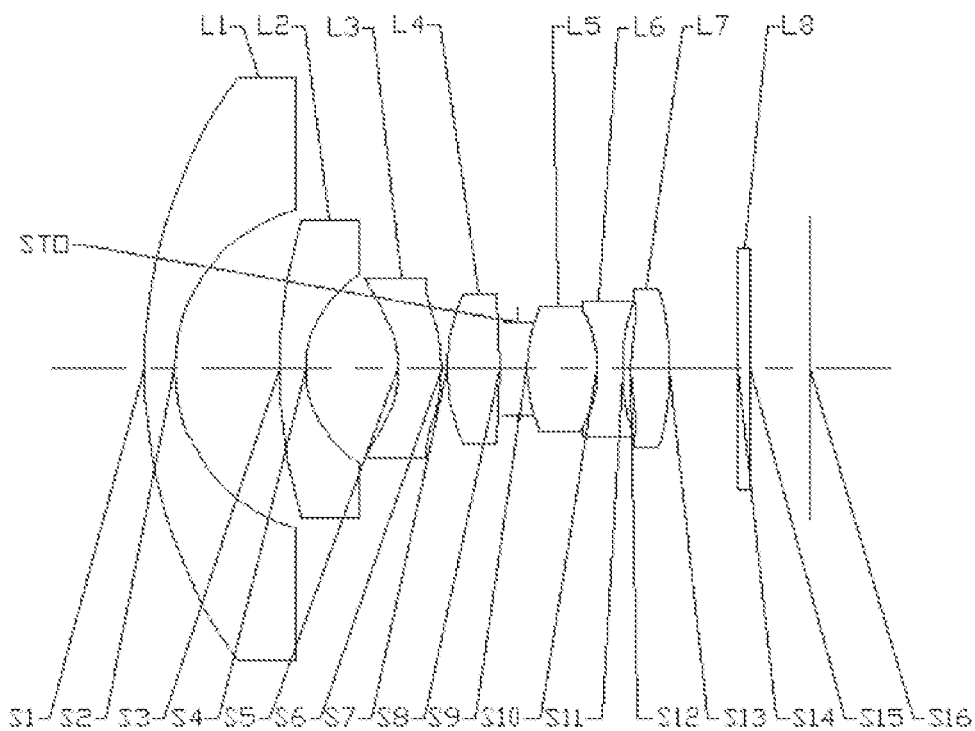
FIG. 31 is a structural schematic diagram of a wide-angle camera lens according to embodiment VII.
Figure 32:
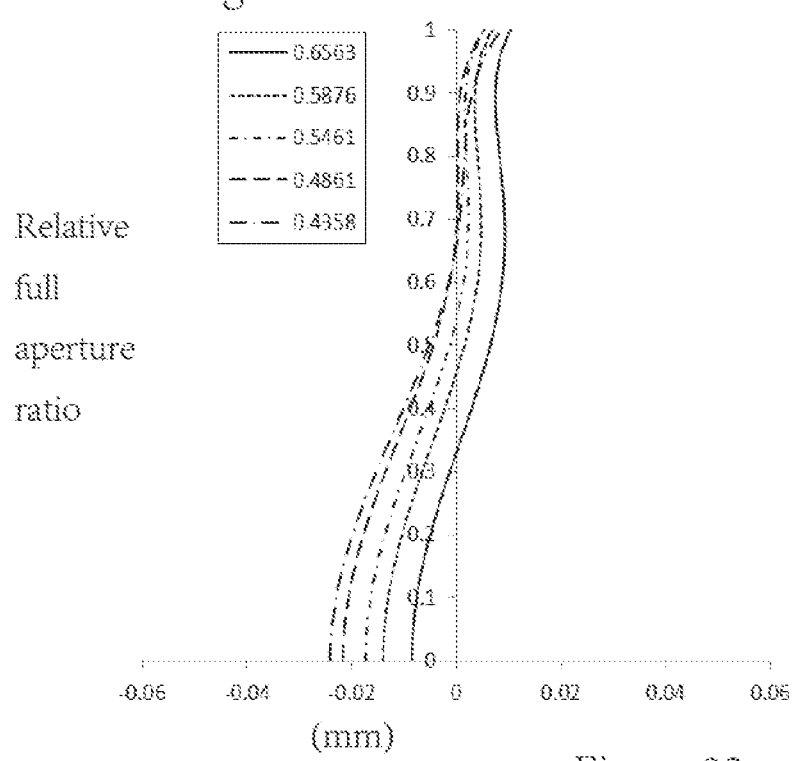
FIG. 32 is a longitudinal aberration diagram of the wide-angle camera lens according to embodiment VII.
Figure 33:
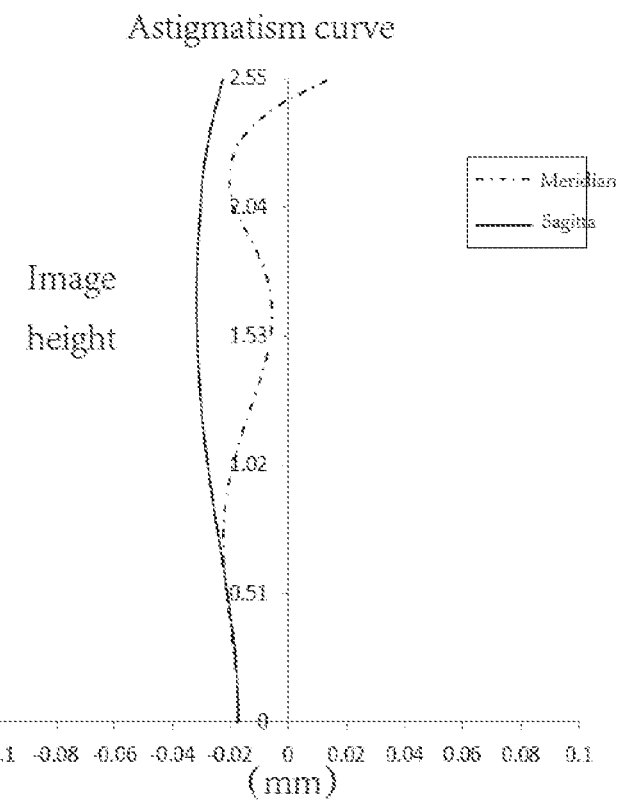
FIG. 33 is an astigmatism diagram of the wide-angle camera lens according to embodiment VII.
Figure 34:
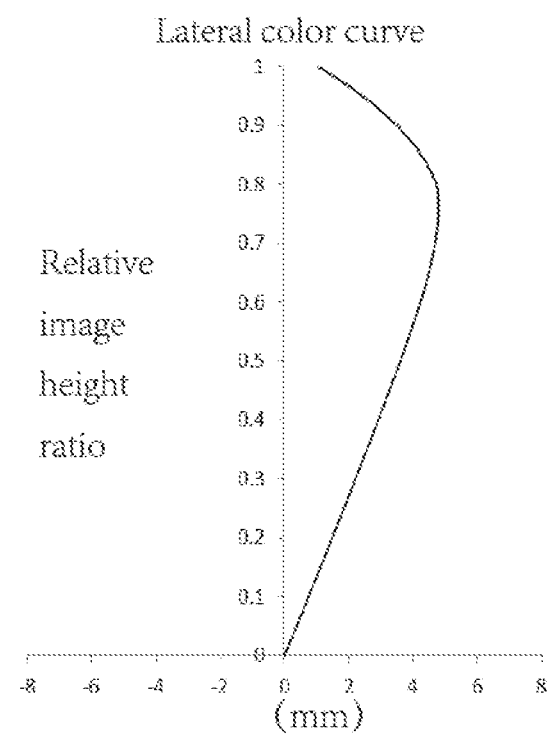
FIG. 34 is a lateral colordiagram of the wide-angle camera lens according to embodiment VII.
Figure 35:
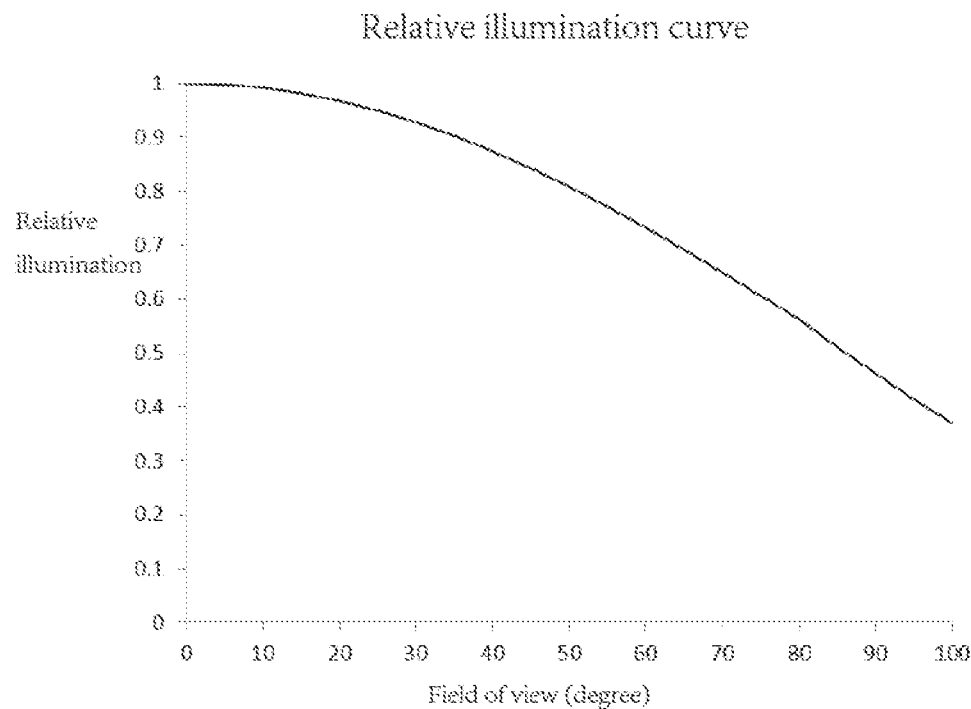
FIG. 35 is a relative illumination curve diagram of the wide-angle camera lens according to embodiment VII.

Referring to FIG. 31, a wide-angle camera lens according to the present embodiment is successively provided with: a first optical lens L1 with negative refractive power, a second optical lens L2 with negative refractive power, a third optical lens L3 with negative refractive power, a fourth optical lens L4 with positive refractive power, a fifth optical lens L5 with positive refractive power, a sixth optical lens L6 with negative refractive power, a seventh optical lens L7 with positive refractive power, and a light filter L8 along an optical axis from an object side to an image side. The first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S10 and an image side surface S11, the seventh optical lens L7 has an object side surface S12 and an image side surface S13, and the light filter L8 has an object side surface S14 and an image side surface S15. An image side surface S16 of the wide-angle camera lens according to the present embodiment is disposed at an image side of the light filter L8, and can be used for mounting a photosensitive element.

Main design parameters of the wide-angle camera lens according to the present embodiment are shown in the following table:

| Name | Numerical value |
|---|---|
| Effective focal length of the first optical lens: f1(mm) | −5.55 |
| Effective focal length of the second ontical lens: f2(mm) | −4.39 |
| Effective focal length of the third ontical lens: f3(mm) | −13.28 |
| Effective focal length of the fourth optical lens: f4(mm) | 4.12 |
| Effective focal length of the fifth optical lens: f5(mm) | 1.69 |
| Effective focal length of the sixth optical lens: f6(mm) | −1.48 |
| Effective focal length of the seventh optical lens: f7(mm) | 4.00 |
| Effective focal length of the wide-angle camera optical | 1.37 |
| Axial distance from the object side surface of the first optical lens to an image side surface of the wide-angle lens: TTL (mm) | 11 |
| f1/f | −4.05 |

-continued

| Name | Numerical value |
|---|---|
| f5/f6 | −1.14 |
| R5/R6 | 0.66 |
| DT11/DT72 | 3.67 |
| DT31/DT72 | 1.13 |
| ImgH × tan(FOV/3)/TTL | 0.53 |
| CT2/CT3 | 0.62 |
| ΣCT/TTL | 0.43 |
| T34 × 10/T23 | 0.65 | wherein R5 is a curvature radius of the object side surface of the third optical lens; R6 is a curvature radius of the image side surface of the third optical lens; DT11 is an effective radius of the object side surface of the first optical lens; DT72 is an effective radius of the image side surface of the seventh optical lens; DT31 is an effective radius of the object side surface of the third optical lens; ImgH is half of a diagonal line length of an effective pixel area of an electronic photosensitive element; FOV is a maximum field angle of an ultra-wide-angle optical lens; TTL is an axial distance from the object side surface of the first optical lens to an image side surface of the wide-angle lens; CT2 is a center thickness of the second optical lens on the optical axis; CT3 is a center thickness of the third optical lens on the optical axis; ΣCT is a sum of the center thicknesses of the first optical lens to the seventh optical lens on the optical axis; T34 is an axial spacing distance of the third optical lens and the fourth optical lens; and T23 is an axial spacing distance of the second optical lens and the third optical lens.

In order to realize the above design parameters, the specific design adopted by the wide-angle camera lens according to the present embodiment is shown in the following table:

| Surface number | Surface type | Curvature radius | Thickness | Material | Conic Coefficient |
|---|---|---|---|---|---|
| OBJ | Spherical surface | Infinity | Infinity | | |
| S1 | Spherical surface | 8.3292 | 0.5000 | 1.755/52.3 | |
| S2 | Spherical surface | 2.7252 | 1.7287 | | |
| S3 | Spherical surface | 8.4252 | 0.4400 | 1.535/55.8 | |
| S4 | Spherical surface | 1.8096 | 1.5281 | | |
| S5 | Aspheric surface | −1.8246 | 0.7067 | 1.535/55.8 | 0.0000 |
| S6 | Aspheric surface | −2.7833 | 0.1000 | | 0.0000 |
| S7 | Aspheric surface | 2.8593 | 0.8682 | 1.583/30.2 | 0.0000 |
| S8 | Aspheric surface | −13.9108 | 0.3105 | | 0.0000 |
| STO | Spherical surface | Infinity | 0.1361 | | |
| S9 | Spherical surface | 2.6059 | 1.1689 | 1.750/52.3 | |
| S10 | Spherical surface | −2.0000 | 0.0000 | | |
| S11 | Spherical surface | −2.0000 | 0.4200 | 1.847/23.8 | |
| S12 | Spherical surface | 3.7801 | 0.1271 | | |
| S13 | Aspheric surface | 3.5987 | 0.6459 | 1.535/55.8 | 2.6000 |
| S14 | Aspheric surface | −5.0181 | 1.1098 | | 0.0000 |
| S15 | Spherical surface | Infinity | 0.2100 | 1.517/64.2 | |
| S16 | Spherical surface | Infinity | 1.0000 | | |
| S17 | Spherical surface | Infinity | | | |

High-order term coefficients (A4, A6, A8, A10, A12 and A14) of the aspheric surfaces of aspheric lenses in the wide-angle camera lens according to the present embodiment are shown in the following table:

| Surface number | A4 | A6 | A8 | A10 | A12 | A14 |
|---|---|---|---|---|---|---|
| S5 | 9.2320E−03 | 8.2869E−03 | 5.1824E−03 | −7.4657E−04 | −2.2169E−07 | 0.0000E+00 |
| S6 | −5.4004E−03 | 1.4938E−02 | −1.6239E−03 | 2.1044E−03 | −8.8651E−07 | 0.0000E+00 |
| S7 | −1.0929E−02 | −1.2999E−03 | −1.9964E−03 | 3.4924E−03 | −1.9773E−17 | 0.0000E+00 |
| S8 | 2.5017E−03 | −2.5810E−02 | 1.2527E−02 | 4.6631E−04 | −1.9773E−17 | −2.6598E−19 |
| S13 | −5.2564E−02 | −1.8568E−02 | 1.7158E−02 | −1.6828E−02 | −9.2206E−05 | 0.0000E+00 |
| S14 | 1.6095E−02 | 1.0420E−03 | −8.2870E−03 | 1.1575E−03 | −6.9990E−06 | 0.0000E+00 |

The wide-angle camera lens according to the present embodiment well corrects off axis aberration, the brightness of an edge image surface, distortion and the like on the basis of realizing an ultra-wide angle; and referring to FIGS. 32, 33, 34 and 35, good usability and high relative illumination are maintained while the miniaturization is realized.

Embodiment VIII

Figure 36:
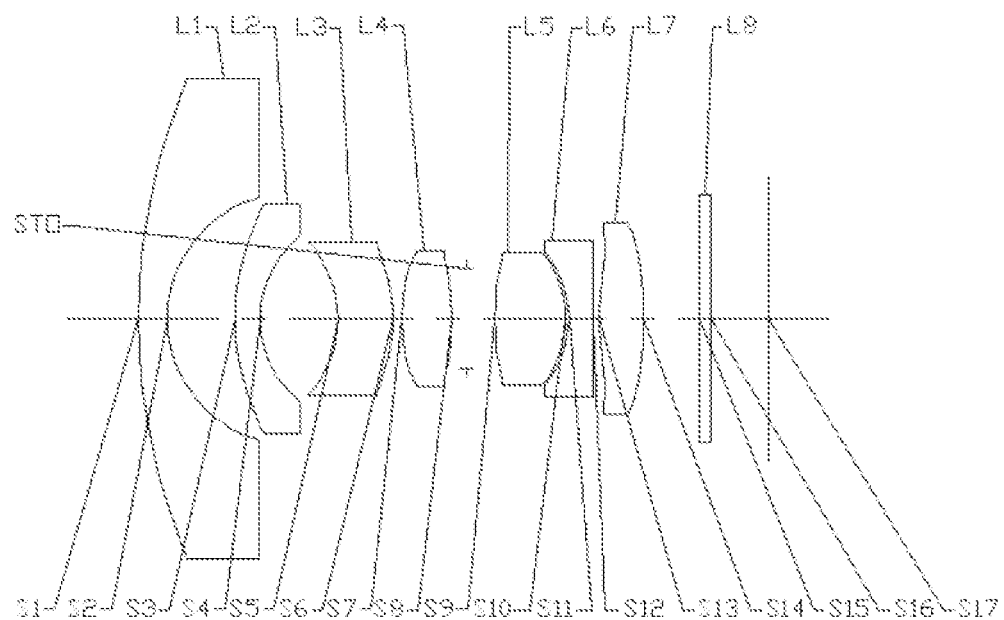
FIG. 36 is a structural schematic diagram of a wide-angle camera lens according to embodiment VIII.
Figure 37:
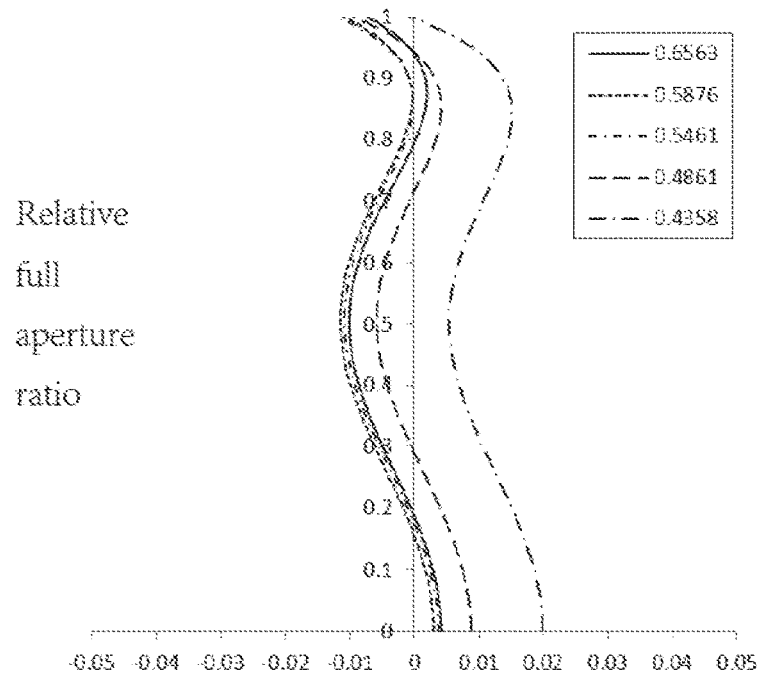
FIG. 37 is a longitudinalaberration diagram of the wide-angle camera lens according to embodiment VIII.
Figure 38:
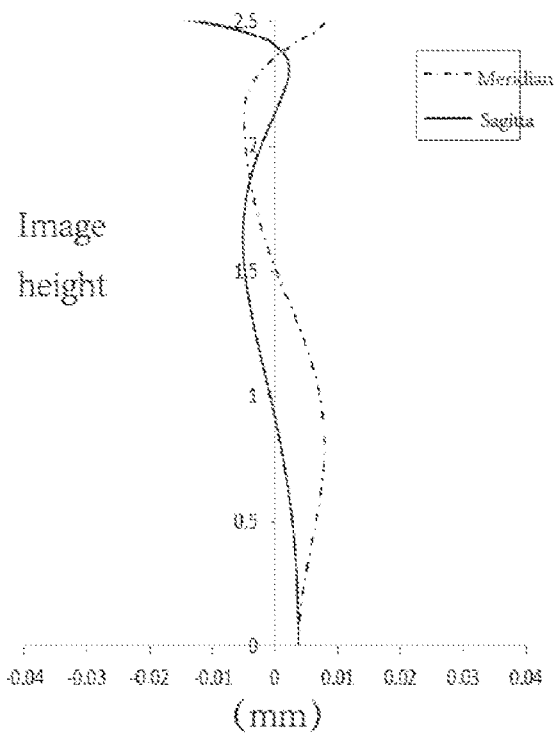
FIG. 38 is an astigmatism diagram of the wide-angle camera lens according to embodiment VIII.
Figure 39:
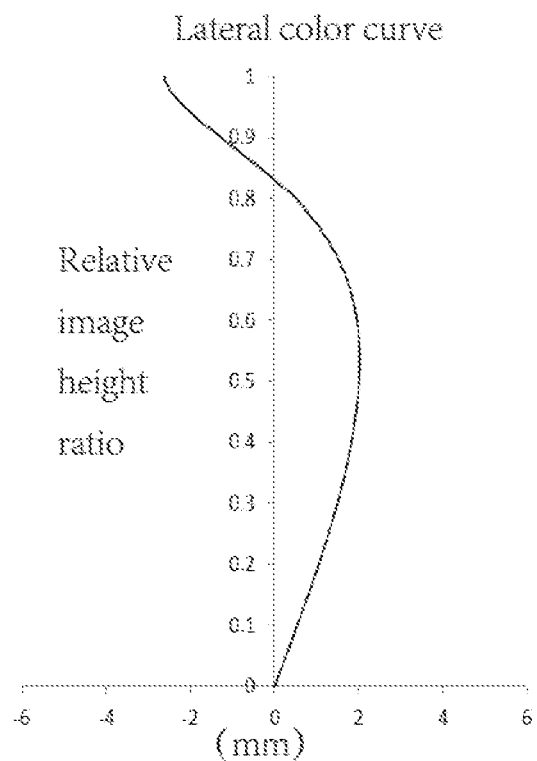
FIG. 39 is a lateral color diagram of the wide-angle camera lens according to embodiment VIII.
Figure 40:
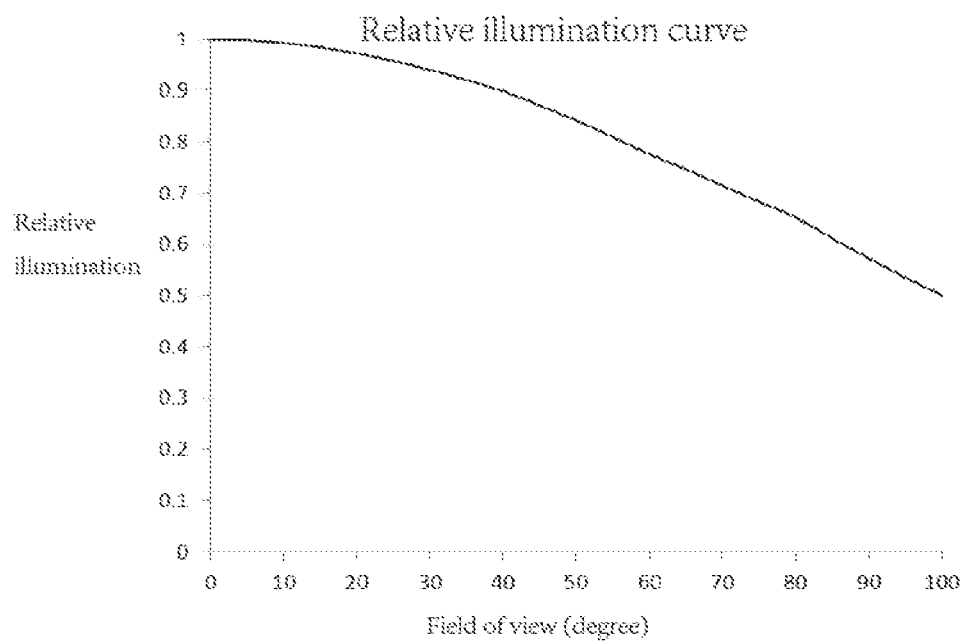
FIG. 40 is a relative illumination curve diagram of the wide-angle camera lens according to embodiment VIII.

Referring to FIG. 36, a wide-angle camera lens according to the present embodiment is successively provided with: a first optical lens L1 with negative refractive power, a second optical lens L2 with negative refractive power, a third optical lens L3 with negative refractive power, a fourth optical lens L4 with positive refractive power, a fifth optical lens L5 with positive refractive power, a sixth optical lens L6 with negative refractive power, a seventh optical lens L7 with positive refractive power, and a light filter L8 along an optical axis from an object side to an image side. The first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the light filter L8 has an object side surface S15 and an image side surface S16. An image side surface S17 of the wide-angle camera lens according to the present embodiment is disposed at an image side of the light filter L8, and can be used for mounting a photosensitive element.

Main design parameters of the wide-angle camera lens according to the present embodiment are shown in the following table:

| Name | Numerical value |
|---|---|
| Effective focal length of the first optical lens: f1(mm) | −4.31 |
| Effective focal length of the second optical lens: f2(mm) | −6.85 |
| Effective focal length of the third optical lens: f3(mm) | −17.61 |
| Effective focal length of the fourth optical lens: f4(mm) | 3.03 |
| Effective focal length of the fifth optical lens: f5(mm) | 2.77 |
| Effective focal length of the sixth optical lens: f6(mm) | −2.08 |
| Effective focal length of the seventh optical lens: f7(mm) | 5.16 |
| Effective focal length of the wide-angle camera optical | 1.66 |
| Axial distance from the object side surface of the first optical lens to an image side surface of the wide-angle lens: TTL (mm) | 11 |
| f1/f | −2.60 |

-continued

| Name | Numerical value |
|---|---|
| f5/f6 | −1.33 |
| R5/R6 | 0.68 |

-continued

| Name | Numerical value |
|---|---|
| DT11/DT72 | 2.52 |
| DT31/DT72 | 0.81 |
| ImgH × tan(FOV/3)/TTL | 0.53 |
| CT2/CT3 | 0.46 |
| ΣCT/TTL | 0.48 |
| T34 × 10/T23 | 1.16 | wherein R5 is a curvature radius of the object side surface of the third optical lens; R6 is a curvature radius of the image side surface of the third optical lens; DT11 is an effective radius of the object side surface of the first optical lens; DT72 is an effective radius of the image side surface of the seventh optical lens; DT31 is an effective radius of the object side surface of the third optical lens; ImgH is half of a diagonal line length of an effective pixel area of an electronic photosensitive element; FOV is a maximum field angle of an ultra-wide-angle lens; TTL is an axial distance from the object side surface of the first lens to an image side surface of the wide-angle lens; CT2 is a center thickness of the second optical lens on the optical axis; CT3 is a center thickness of the third optical lens on the optical axis; ΣCT is a sum of the center thicknesses of the first optical lens to the seventh optical lens on the optical axis; T34 is an axial spacing distance of the third optical lens and the fourth optical lens; and T23 is an axial spacing distance of the second optical lens and the third optical lens.

In order to realize the above design parameters, the specific design adopted by the wide-angle camera lens according to the present embodiment is shown in the following table:

| Surface number | Surface type | Curvature radius | Thickness | Material | Conic Coefficient |
|---|---|---|---|---|---|
| OBJ | Spherical surface | Infinity | Infinity | | |
| S1 | Spherical surface | 10.6976 | 0.5000 | 1.66/57.5 | |
| S2 | Spherical surface | 2.2039 | 1.1850 | | |
| S3 | Spherical surface | 4.2115 | 0.4400 | 1.54/55.8 | |
| S4 | Spherical surface | 1.8926 | 1.3610 | | |
| S5 | Aspheric surface | −1.8112 | 0.9522 | 1.54/55.8 | 0.0000 |
| S6 | Aspheric surface | −2.6513 | 0.1581 | | 0.0000 |
| S7 | Spherical surface | 2.9275 | 0.8678 | 1.62/60.2 | |
| S8 | Spherical surface | −4.6897 | 0.2544 | | |
| STO | Spherical surface | Infinity | 0.5036 | | |
| S9 | Aspheric surface | 5.0401 | 1.2380 | 1.54/65.5 | 0.0000 |
| S10 | Aspheric surface | −1.9477 | 0.0557 | | 0.0000 |
| S11 | Spherical surface | −1.7657 | 0.4200 | 1.85/23.8 | 0.0000 |
| S12 | Aspheric surface | −381.7420 | 0.1068 | | 0.0000 |
| S13 | Aspheric surface | 3.8865 | 0.7711 | 1.54/55.8 | 2.6000 |
| S14 | Aspheric surface | −9.0221 | 0.9762 | | 0.0000 |
| S15 | Spherical surface | Infinity | 0.2100 | 1.52/64.2 | |
| S16 | Spherical surface | Infinity | 1.0000 | | |
| S17 | Spherical surface | Infinity | | | |

High-order term coefficients (A4, A6, A8, A10 and A12) of the aspheric surfaces of aspheric lenses in the wide-angle camera lens according to the present embodiment are shown in the following table:

| Surface number | A4 | A6 | A8 | A10 | A12 |
|---|---|---|---|---|---|
| S5 | −8.7034E−04 | 9.6346E−03 | 2.3233E−03 | −7.3447E−05 | −2.7806E−07 |
| S6 | 9.6200E−03 | 8.6441E−03 | −5.9384E−04 | 5.0468E−04 | −8.1182E−07 |
| S9 | 1.2415E−02 | −1.9739E−02 | 1.5791E−02 | −8.0611E−03 | 6.8894E−08 |
| S10 | −2.5920E−02 | 4.2925E−03 | 4.8676E−03 | −3.7497E−03 | −1.7730E−23 |
| S12 | 4.7248E−03 | 0.0000E+00 | 0.0000E+00 | 0.0000E+00 | 0.0000E+00 |
| S13 | −5.4043E−02 | 6.1495E−03 | −1.9689E−03 | −7.3850E−05 | −9.2232E−05 |
| S14 | −9.5963E−04 | −8.5444E−03 | 2.7148E−03 | 6.4581E−04 | −6.9988E−06 |

The wide-angle camera lens according to the present embodiment well corrects off axis aberration, the brightness of an edge image surface, distortion and the like on the basis of realizing an ultra-wide angle; and referring to FIGS. 37, 38, 39 and 40, good usability and high relative illumination are maintained while the miniaturization is realized.

Embodiment IX

Figure 41:
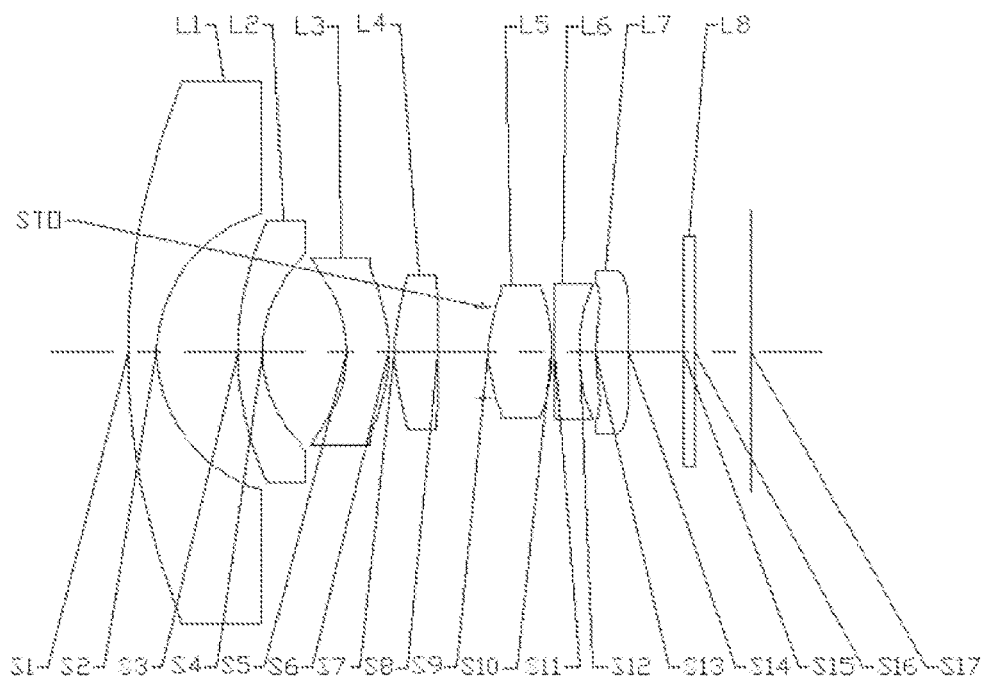
FIG. 41 is a structural schematic diagram of a wide-angle camera lens according to embodiment IX.
Figure 42:
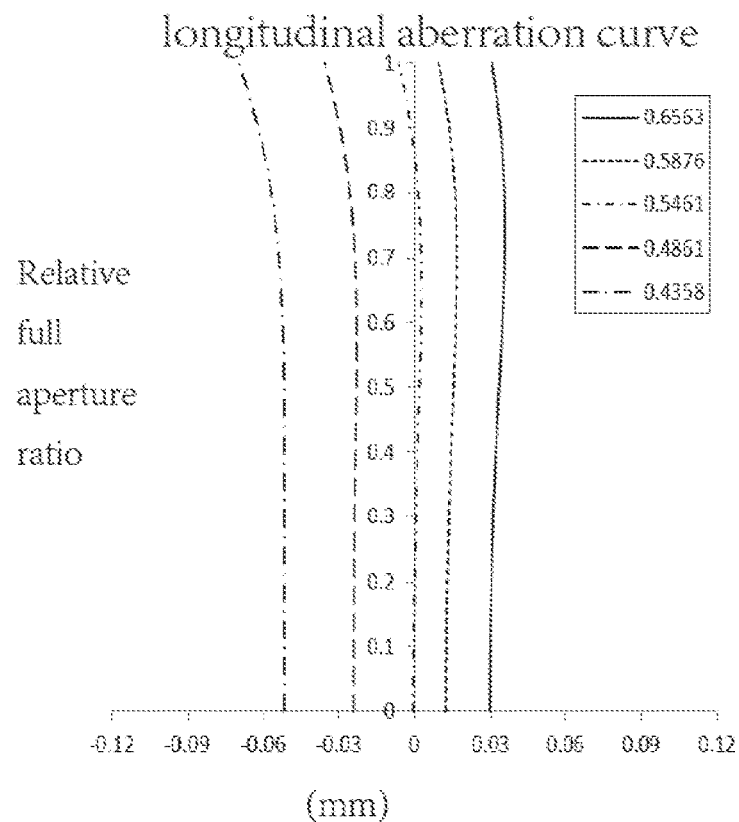
FIG. 42 is a longitudinal aberration diagram of the wide-angle camera lens according to embodiment IX.
Figure 43:
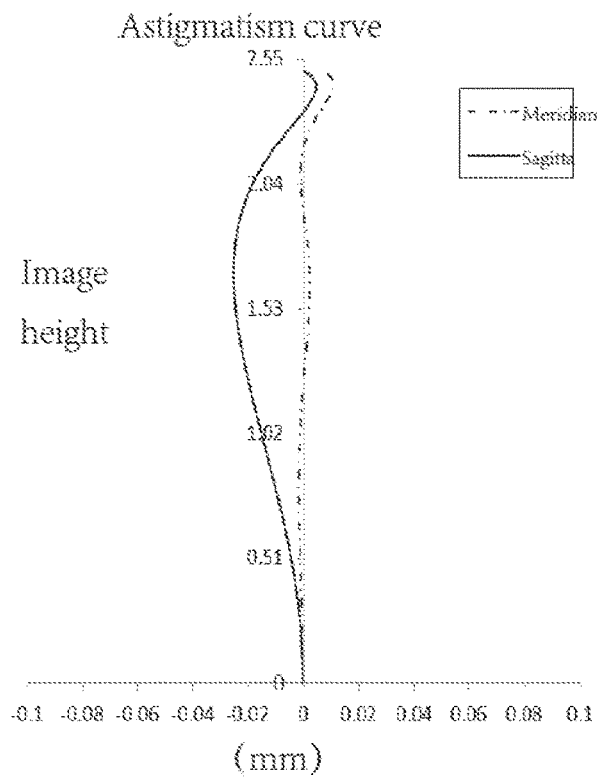
FIG. 43 is an astigmatism diagram of the wide-angle camera lens according to embodiment IX.
Figure 44:
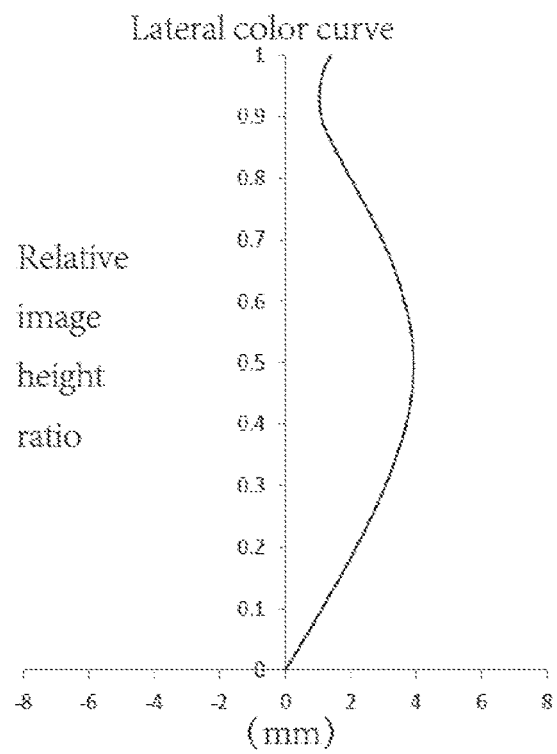
FIG. 44 is a lateral color diagram of the wide-angle camera lens according to embodiment IX.
Figure 45:
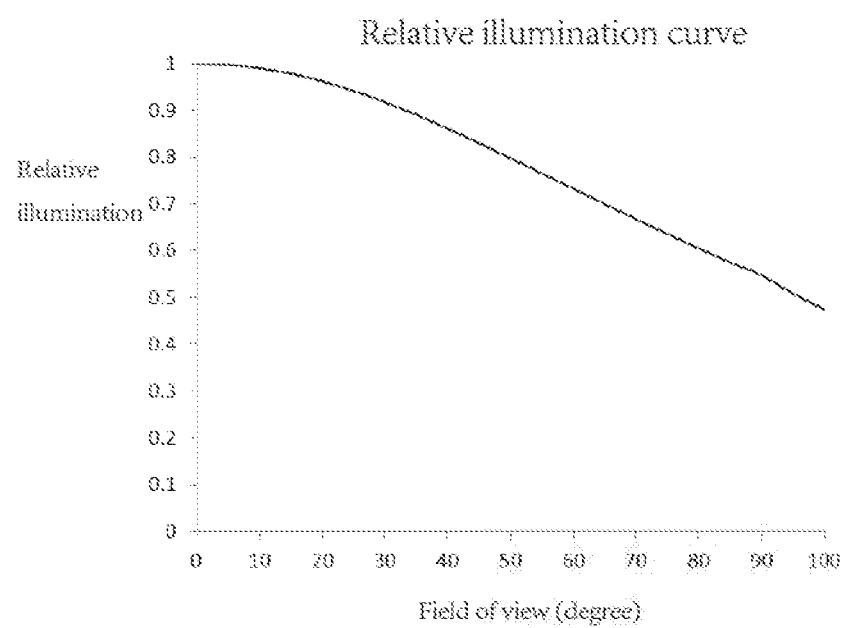
FIG. 45 is a relative illumination curve diagram of the wide-angle camera lens according to embodiment IX.

Referring to FIG. 41, a wide-angle camera lens according to the present embodiment is successively provided with: a first optical lens L1 with negative refractive power, a second optical lens L2 with negative refractive power, a third optical lens L3 with negative refractive power, a fourth optical lens L4 with positive refractive power, a fifth optical lens L5 with positive refractive power, a sixth optical lens L6 with negative refractive power, a seventh optical lens L7 with positive refractive power, and a light filter L8 along an optical axis from an object side to an image side. The first optical lens L1 has an object side surface S1 and an image side surface S2, the second optical lens L2 has an object side surface S3 and an image side surface S4, the third optical lens L3 has an object side surface S5 and an image side surface S6, the fourth optical lens L4 has an object side surface S7 and an image side surface S8, the fifth optical lens L5 has an object side surface S9 and an image side surface S10, the sixth optical lens L6 has an object side surface S11 and an image side surface S12, the seventh optical lens L7 has an object side surface S13 and an image side surface S14, and the light filter L8 has an object side surface S15 and an image side surface S16. An image side surface S17 of the wide-angle camera lens according to the present embodiment is disposed at an image side of the light filter L8, and can be used for mounting a photosensitive element.

Main design parameters of the wide-angle camera lens according to the present embodiment are shown in the following table:

| Name | Numerical value |
|---|---|
| Effective focal length of the first optical lens: f1(mm) | −5.21 |
| Effective focal length of the second optical lens: f2(mm) | −8.26 |
| Effective focal length of the third optical lens: f3(mm) | −17.97 |
| Effective focal length of the fourth optical lens: f4(mm) | 5.72 |
| Effective focal length of the fifth optical lens: f5(mm) | 2.45 |
| Effective focal length of the sixth optical lens: f6(mm) | −3.47 |
| Effective focal length of the seventh optical lens: f7(mm) | 8.62 |
| Effective focal length of the wide-angle camera optical lens: | 1.64 |
| Axial distance from the object side surface of the first optical lens to an image side surface of the wide-angle lens: TTL (mm) | 11 |
| f1/f | −3.18 |
| f5/f6 | −0.71 |
| R5/R6 | 0.70 |
| DT11/DT72 | 3.32 |
| DT31/DT72 | 1.15 |
| ImgH × tan(FOV/3)/TTL | 0.53 |
| CT2/CT3 | 0.59 |
| ΣCT/TTL | 0.42 |
| T34 × 10/T23 | 0.68 | wherein R5 is a curvature radius of the object side surface of the third optical lens; R6 is a curvature radius of the image side surface of the third optical lens; DT11 is an effective radius of the object side surface of the first optical lens; DT72 is an effective radius of the image side surface of the seventh optical lens; DT31 is an effective radius of the object side surface of the third optical lens; ImgH is half of a diagonal line length of an effective pixel area of an electronic photosensitive element; FOV is a maximum field angle of an ultra-wide-angle lens; TTL is an axial distance from the object side surface of the first optical lens to an image side surface of the wide-angle lens; CT2 is a center thickness of the second optical lens on the optical axis; CT3 is a center thickness of the third optical lens on the optical axis; ΣCT is a sum of the center thicknesses of the first optical lens to the seventh optical lens on the optical axis; T34 is an axial spacing distance of the third optical lens and the fourth optical lens; and T23 is an axial spacing distance of the second optical lens and the third optical lens.

In order to realize the above design parameters, the specific design adopted by the wide-angle camera lens according to the present embodiment is shown in the following table:

| Surface number | Surface type | Curvature radius | Thickness | Material | Conic Coefficient |
|---|---|---|---|---|---|
| OBJ | Spherical surface | Infinity | Infinity | | |
| S1 | Spherical surface | 12.5220 | 0.5000 | 1.62/60.3 | |
| S2 | Spherical surface | 2.5381 | 1.4341 | | |
| S3 | Spherical surface | 5.4923 | 0.4400 | 1.54/55.8 | |
| S4 | Spherical surface | 2.3868 | 1.4807 | | |
| S5 | Aspheric surface | −2.1042 | 0.7513 | 1.54/55.8 | 0.0000 |
| S6 | Aspheric surface | −3.0262 | 0.1000 | | 0.0000 |
| S7 | Aspheric surface | 3.2314 | 0.7684 | 1.58/30.2 | 0.0000 |
| S8 | Aspheric surface | 79.2783 | 0.7900 | | 0.0000 |
| STO | Spherical surface | Infinity | 0.1000 | | |
| S9 | Aspheric surface | 2.4030 | 1.1194 | 1.62/60.3 | 0.0000 |
| S10 | Spherical surface | −3.4267 | 0.0500 | | |
| S11 | Spherical surface | 337.6271 | 0.4200 | 1.85/23.8 | |
| S12 | Aspheric surface | 2.9412 | 0.2931 | | 0.0000 |
| S13 | Aspheric surface | 3.7373 | 0.5863 | 1.54/55.8 | 2.6000 |
| S14 | Aspheric surface | 18.3278 | 0.9567 | | 0.0000 |
| S15 | Spherical surface | Infinity | 0.2100 | 1.52/64.2 | |
| S16 | Spherical surface | Infinity | 1.0000 | | |
| S17 | Spherical surface | Infinity | | | |

High-order term coefficients (A4, A6, A8, A10, A12 and A14) of the aspheric surfaces of aspheric lenses in the wide-angle camera lens according to the present embodiment are shown in the following table:

| Surface number | A4 | A6 | A8 | A10 | A12 | A14 |
|---|---|---|---|---|---|---|
| S5 | 2.7061E−03 | 1.8316E−04 | 4.2232E−03 | −5.3616E−04 | −2.7806E−07 | 0.0000E+00 |
| S6 | −1.0781E−02 | 1.0286E−02 | −1.7333E−03 | 8.6713E−04 | −8.1182E−07 | 0.0000E+00 |
| S7 | −2.3934E−02 | −4.6196E−04 | −2.2764E−03 | 1.6586E−03 | −1.8161E−08 | 0.0000E+00 |
| S8 | −1.9628E−02 | −9.8630E−03 | 4.8180E−03 | 1.2457E−04 | 1.0054E−08 | 3.8948E−09 |
| S9 | −2.2406E−02 | −3.5729E−03 | 3.0743E−03 | −9.0997E−04 | 6.8894E−08 | 0.0000E+00 |
| S12 | 3.1902E−04 | 0.0000E+00 | 0.0000E+00 | 0.0000E+00 | 0.0000E+00 | 0.0000E+00 |
| S13 | −6.0430E−02 | −1.2823E−02 | −2.4072E−03 | −3.3525E−03 | −9.2232E−05 | 0.0000E+00 |
| S14 | −1.9688E−02 | −1.4570E−02 | 5.2852E−04 | −5.5746E−04 | −6.9988E−06 | 0.0000E+00 |

The wide-angle camera lens according to the present embodiment well corrects off axis aberration, the brightness of an edge image surface, distortion and the like on the basis of realizing an ultra-wide angle; and referring to FIGS. 42, 43, 44 and 45, good usability and high relative illumination are maintained while the miniaturization is realized.

The above nine embodiments are merely preferred specific embodiments for sufficiently explaining the wide-angle camera lens of the present invention rather than limiting the protection scope of the present invention. Equivalent replacements or changes made by the skilled in the art on the basis of the present invention shall fall within the protection scope of the present invention. The protection scope of the present invention is subject to the claims.

The invention claimed is:

1. A wide-angle camera lens, successively comprising from an object side to an image side:
   a first optical lens with a negative refractive power;
   a second optical lens with a refractive power;
   a third optical lens with a negative refractive power, an image side surface of the third optical lens being a convex surface;
   a fourth optical lens with a refractive power;
   a fifth optical lens with a refractive power;
   a sixth optical lens with a refractive power; and
   a seventh optical lens with a refractive power;
   wherein the wide-angle camera lens satisfies:

$-5.5 < f1/f < -2;$ $-2.5 < f5/f6 < -0.5;$ and $0.45 < ImgH \times \tan(FOV/3)/TTL < 0.8,$ where f1 is an effective focal length of the first optical lens, f is an effective focal length of the wide-angle camera lens, f5 is an effective focal length of the fifth optical lens, f6 is an effective focal length of the sixth optical lens, ImgH is a half of a diagonal line length of an effective pixel area of an electronic photosensitive element, FOV is a maximum field angle of the wide-angle camera lens, and TTL is an axial distance from the object side surface of the first optical lens to an image side surface of the wide-angle camera lens.

2. The wide-angle camera lens according to claim 1, characterized in that an object side surface of the first optical lens is a convex surface, and an image side surface of the first optical lens is a concave surface.

3. The wide-angle camera lens according to claim 1, characterized in that the second optical lens has a negative refractive power, and an image side surface of the second optical lens is a concave surface.

4. The wide-angle camera lens according to claim 1, characterized in that the wide-angle camera lens satisfies:

$0.5 < R5/R6 < 1,$ where R5 is a curvature radius of an object side surface of the third optical lens; and R6 is a curvature radius of the image side surface of the third optical lens.

5. The wide-angle camera lens according to claim 1, characterized in that the fourth optical lens has a positive refractive power, and an object side surface of the fourth optical lens is a convex surface.

6. The wide-angle camera lens according to claim 1, characterized in that an object side surface of the fifth optical lens is a convex surface.

7. The wide-angle camera lens according to claim 1, characterized in that an object side surface of the seventh optical lens is a convex surface.

8. The wide-angle camera lens according to claim 1, characterized in that the wide-angle camera lens satisfies:

$2.5 < DT11/DT72 < 3.7,$ where DT11 is an effective radius of the object side surface of the first optical lens, and DT72 is an effective radius of an image side surface of the seventh optical lens.

9. The wide-angle camera lens according to claim 1, characterized in that the wide-angle camera lens satisfies:

$0.8 < DT31/DT72 < 1.2,$ where DT31 is an effective radius of an object side surface of the third optical lens; and DT72 is an effective radius of an image side surface of the seventh optical lens.

10. The wide-angle camera lens according to claim 1, characterized in that the wide-angle camera lens satisfies:

$0.4 < CT2/CT3 < 1,$ where CT2 is a center thickness of the second optical lens on an optical axis, and CT3 is a center thickness of the third optical lens on the optical axis.

11. The wide-angle camera lens according to claim 1, characterized in that the wide-angle camera lens satisfies:

$0.3 < \Sigma CT/TTL < 0.5,$ where $\Sigma CT$ is a sum of the center thicknesses of the first optical lens to the seventh optical lens on an optical axis, and TTL is an axial distance from the object side surface of the first optical lens to an image side surface of the wide-angle camera lens.

12. The wide-angle camera lens according to claim 1, characterized in that the wide-angle camera lens satisfies:

$0.5 < T34 \times 10/T23 < 1.2,$ where T34 is an axial spacing distance of the third optical lens and the fourth optical lens, and T23 is an axial spacing distance of the second optical lens and the third optical lens.

13. The wide-angle camera lens according to claim 1, characterized in that at least one of the first to the seventh optical lenses is made of glass material and at least other one of the lenses is made of plastic material.

* * * * *